(12) United States Patent
Itou

(10) Patent No.: US 10,593,301 B2
(45) Date of Patent: Mar. 17, 2020

(54) DISPLAY CONTROL APPARATUS

(71) Applicant: DENSO CORPORATION, Kariya, Aichi-pref. (JP)

(72) Inventor: Masakazu Itou, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/775,016

(22) PCT Filed: Nov. 4, 2016

(86) PCT No.: PCT/JP2016/082742
§ 371 (c)(1),
(2) Date: May 10, 2018

(87) PCT Pub. No.: WO2017/082155
PCT Pub. Date: May 18, 2017

(65) Prior Publication Data
US 2018/0322849 A1 Nov. 8, 2018

(30) Foreign Application Priority Data

Nov. 13, 2015 (JP) .................................. 2015-223331

(51) Int. Cl.
*G09G 5/38* (2006.01)
*G09G 5/14* (2006.01)
(Continued)

(52) U.S. Cl.
CPC .............. *G09G 5/38* (2013.01); *B60K 35/00* (2013.01); *G06F 3/0481* (2013.01); *G09G 5/14* (2013.01);
(Continued)

(58) Field of Classification Search
CPC ............ G09G 5/38; G09G 5/14; G09G 5/377; G09G 2350/00; G09G 2354/00;
(Continued)

(56) References Cited

U.S. PATENT DOCUMENTS 4,642,790 A * 2/1987 Minshull ................ G09G 5/346
345/672
6,384,846 B1 5/2002 Hiroi
(Continued)

FOREIGN PATENT DOCUMENTS

JP 2008293419 A 12/2008
JP 2009140488 A 6/2009
(Continued)

*Primary Examiner* — Tom V Sheng
(74) *Attorney, Agent, or Firm* — Harness, Dickey & Pierce, P.L.C.

(57) ABSTRACT

A display control apparatus includes: an operation receiving portion receiving a command operation by a user; a drawing processing portion drawing an application image; and a display processing portion generating an image for display using the application image, and displaying the image for display on a display. Multiple display areas are set on a display screen, and an area rating indicating the ranking of visibility of information to the user is assigned in advance to each of the multiple display areas. A display area which is the display destination on the screen corresponding to an application software is set in advance for the application software. A drawing processing portion draws an application image for displaying in a display area having a higher area rating preferentially over an application image for displaying in a display area having a lower area rating, among the multiple display areas.

5 Claims, 14 Drawing Sheets

(51) Int. Cl.
*G06F 3/0481* (2013.01)
*B60K 35/00* (2006.01)
*H04N 5/66* (2006.01)
*G09G 5/377* (2006.01)
*G06F 3/0488* (2013.01)

(52) U.S. Cl.
CPC ............... *G09G 5/377* (2013.01); *H04N 5/66* (2013.01); *G06F 3/0488* (2013.01); *G09G 2350/00* (2013.01); *G09G 2354/00* (2013.01)

(58) Field of Classification Search
CPC ..... B60K 35/00; G06F 3/0481; G06F 3/0487; G06F 3/0488; H04N 5/66
See application file for complete search history.

(56) References Cited

U.S. PATENT DOCUMENTS

| | | | | |
|---|---|---|---|---|
| 8,290,540 | B2* | 10/2012 | Kittel | G06F 3/0481 455/566 |
| 9,442,743 | B2* | 9/2016 | Kim | G06F 1/1616 |
| 2006/0055702 | A1 | 3/2006 | Hall | |
| 2007/0011603 | A1* | 1/2007 | Makela | G06F 3/0481 715/234 |
| 2007/0126718 | A1* | 6/2007 | Wu | G06F 3/1454 345/204 |
| 2008/0309474 | A1 | 12/2008 | Okamoto et al. | |
| 2009/0179745 | A1 | 7/2009 | Okamoto et al. | |
| 2009/0298545 | A1* | 12/2009 | Kittel | G06F 3/0481 455/566 |
| 2010/0088623 | A1* | 4/2010 | Ichino | G06F 3/0481 715/766 |
| 2010/0117810 | A1* | 5/2010 | Hagiwara | G06F 3/0483 340/425.5 |
| 2011/0037896 | A1* | 2/2011 | Lin | G06F 3/14 348/564 |
| 2011/0099512 | A1* | 4/2011 | Jeong | G06F 3/0481 715/790 |
| 2012/0289290 | A1* | 11/2012 | Chae | G06F 3/0488 455/566 |
| 2013/0042201 | A1* | 2/2013 | Sandman, Jr. | G06F 9/542 715/781 |
| 2014/0075384 | A1* | 3/2014 | Kritt | G06F 3/0488 715/811 |
| 2014/0164991 | A1* | 6/2014 | Kim | G06F 3/0481 715/794 |
| 2014/0298213 | A1* | 10/2014 | Huang | G06F 3/04817 715/762 |
| 2014/0372918 | A1* | 12/2014 | Wang | G06F 3/0481 715/765 |
| 2015/0253965 | A1* | 9/2015 | Xu | G06F 3/0488 715/747 |
| 2016/0011576 | A1 | 1/2016 | Takeda et al. | |
| 2016/0071491 | A1* | 3/2016 | Berryman | G06F 3/0484 345/173 |
| 2017/0344255 | A1* | 11/2017 | Xie | G06F 3/0487 |

FOREIGN PATENT DOCUMENTS

| | | |
|---|---|---|
| JP | 4455594 B2 | 4/2010 |
| JP | 2014076688 A | 5/2014 |
| JP | 2014197370 A | 10/2014 |

* cited by examiner

| APPLICATION | DISPLAY AREA | LOAD LEVEL |
|---|---|---|
| ENERGY MONITOR | 1ST AREA | HIGH |
| DIGITAL TELEVISION (TV) | 3RD AREA | HIGH |
| REAR MONITOR | 2ND AREA | HIGH |
| AIR CONDITIONER (AC) | 2ND AREA | LOW |
| BROWSER | 1ST AREA | LOW |
| AUDIO | 3RD AREA | LOW |
| ... | ... | ... |

(A)  (B)

DISPLAY CONTROL APPARATUS

CROSS REFERENCE TO RELATED APPLICATIONS

This application is a U.S. National Phase Application under 35 U.S.C. 371 of International Application No. PCT/JP2016/082742 filed on Nov. 4, 2016 and published in Japanese as WO 2017/082155 A1 on May 18, 2017. This application is based on and claims the benefit of priority from Japanese Patent Application No. 2015-223331 filed on Nov. 13, 2015. The entire disclosures of all of the above applications are incorporated herein by reference.

TECHNICAL FIELD

The present disclosure relates to a display control apparatus that controls a display screen of a display.

BACKGROUND ART

In order to provide much more information for a user, an on-vehicle display has been enlarged. In association with the enlargement of the on-vehicle display, an opportunity to display screens corresponding to multiple kinds of application software (hereinafter, referred to as application or APP) at the same time has been increased. Patent Literature 1 discloses a technology for displaying the screens corresponding to multiple kinds of the applications on an on-vehicle display at the same time.

Examples of the screens displayed on the on-vehicle display include a camera screen, an energy monitoring screen, a digital television screen, and a browser screen. The camera screen displays, for example, an image captured by an on-vehicle camera that captures images of a rear area of a vehicle. The energy monitoring screen displays a flow of energy or a working state of a motor and a battery mounted on a vehicle. The digital television screen displays a digital television program. The web browser screen is served as a web browser. Of course, the screens displayed on the on-vehicle display include various screens in addition to the screens exemplary described above.

PRIOR ART LITERATURES

Patent Literature

Patent Literature 1: JP 4455594 B2

SUMMARY OF INVENTION

In order to display the multiple kinds of the screens on the on-vehicle display at the same time, it is necessary to make a microcomputer for drawing (hereinafter, referred to as a drawing microcomputer) draw images corresponding to respective screens. As a result of that, in a case where the multiple kinds of the screens are displayed on the on-vehicle display at the same time, a load of the drawing microcomputer is apt to be high, and therefore a drawing processing amount requested by each application might exceed a capacity of the drawing microcomputer. In a case where the drawing request exceeds the capacity of the drawing microcomputer, processing failure such as freezing and delay may occur in a part or a whole of the screens.

When the processing failure occurs in the display screen, a user feels a sense of discomfort. In particular, when the processing failure occurs in the screen displayed in an area where a user can view easily among the whole display region of the display, the user may strongly feel the sense of discomfort.

It is an object of the present disclosure to provide a display control apparatus capable of suppressing occurrence of processing failure in a screen arranged at a position where a user can easily view the information in the display region of the display.

According to one aspect of the present disclosure, a display control apparatus that controls a display screen of a display includes: an operation receiving portion that receives, through a predetermined input device, command operation of a user for displaying a screen of predetermined application software on the display; a drawing processing portion that draws an application image to be displayed on the display as a screen of the application software, based on the command operation received by the operation receiving portion; and a display processing portion that generates a display image to be displayed as the display screen on the display by using the application image generated by the drawing processing portion, and displays the generated display image on the display. Multiple display areas is set in the display screen. An area rating, which indicates ranking of visibility of information for a user, is assigned in advance to each of the display areas. A display area, which is a display destination of a screen corresponding to the application software, is set in advance in the application software. The drawing processing portion is configured to draw the application image to be displayed in a display area having a higher area rating preferentially rather than the application image to be displayed in a display area having a lower area rating in the multiple display areas.

According to the configuration described above, the drawing processing portion preferentially draws the application image to be displayed in the display area arranged at a position where a user can easily view the information in the multiple display regions of the display. Accordingly, processing failure is prevented from occurring in the screen arranged at the position where a user can view the information therein relatively easily in display area of the display.

BRIEF DESCRIPTION OF DRAWINGS

The above and other aspects, features and advantages of the present disclosure will become more apparent from the following detailed description made with reference to the accompanying drawings. In the drawings.

DESCRIPTION OF EMBODIMENTS

First Embodiment

Figure 1:
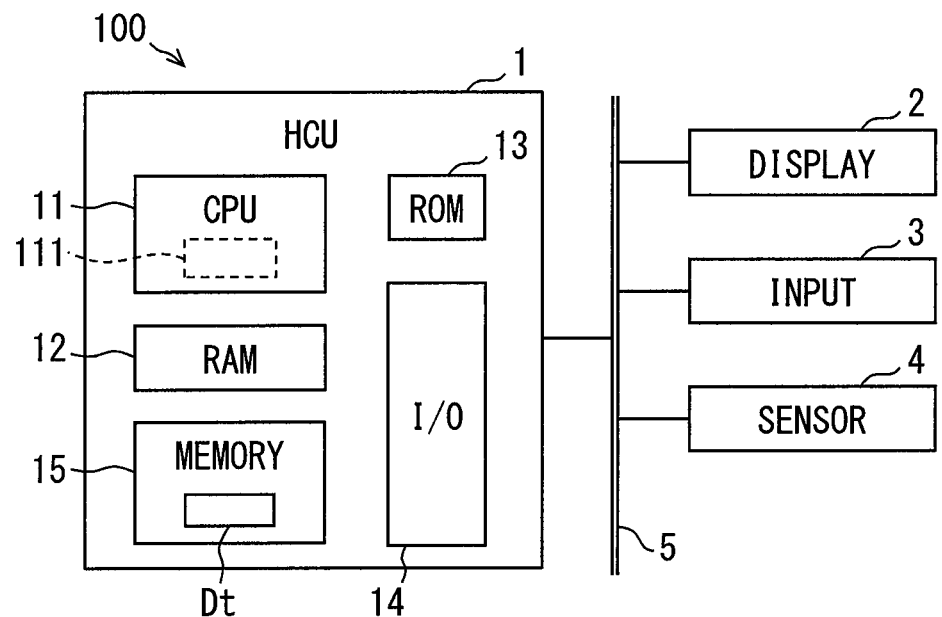
FIG. 1 is a diagram illustrating one example of a schematic configuration of an on-vehicle system according to a first embodiment.

Hereinafter, a first embodiment of the present disclosure will be described with reference to drawings. FIG. 1 is a view illustrating one example of a schematic configuration of an on-vehicle system 100 to which a display control apparatus according to the present disclosure is applied. The on-vehicle system 100 shown in FIG. 1 is mounted on a vehicle. For the sake of convenience, the vehicle on which the on-vehicle system 100 is mounted is provided with both of a motor and an internal combustion engine as driving sources (a so-called hybrid vehicle). As another configuration, the on-vehicle system 100 may be mounted on an electric vehicle, or a vehicle provided with only the internal combustion engine as a driving source.

(Outline of On-Vehicle System 100)

As shown in FIG. 1, the on-vehicle system 100 according to the present embodiment includes a HCU 1, a display 2, an input device 3, and various on-vehicle sensors 4. HCU stands for HMI (Human Machine Interface) Control Unit. The HCU 1 can be mutually communicate with the display 2, the input device 3, and the various on-vehicle sensors 4 via a communication network (hereinafter, LAN: Local Area Network) 5 provided in the vehicle.

The HCU 1 is apparatus that controls a display screen of the display 2 based on a user operation to the input device 3 or based on data input from the on-vehicle sensor 4. That is, the HCU 1 corresponds to a display control apparatus.

The display 2 displays images input from the HCU 1. For example, the display 2 is arranged near the center of an instrument panel. The display 2 is formed as, for example, a full color display device that can be obtained by using a known liquid crystal display, a known organic EL display or the like. The display 2 may be a known head up display.

The input device 3 is a device that receives change operation of a display content of the display 2 or command operation of a user against a predetermined application. For example, the input device 3 may be a touch panel formed integrally with the display 2. In a case where the touch panel is adopted as the input device 3, the input device 3 outputs to the HCU 1 a touch position signal, which indicates a position (hereinafter, referred to as a touch position) touched by the user on the touch panel, when the input device 3 detects touch operation of a user. As another configuration, the input device 3 may be a mechanical element such as a switch, or a voice recognition device provided with a microphone not shown. Further, the input device 3 may be provided with multiple kinds of those devices.

The on-vehicle sensor 4 includes various sensors that detect various state quantities relating to travelling of the vehicle. Examples of the state quantities relating to the travelling of the vehicle include a travel speed, a shift position, an operation state of a direction indicator, a battery residual amount, and a fuel residual amount. That is, the on-vehicle sensor 4 includes a speed sensor that detects the travel speed, a shift position sensor that detects the shift position, a turn switch that outputs a signal indicating the operation state of the direction indicator, or the like are included in the on-vehicle sensor 4. The detection results of the various sensors are provided to the HCU 1 sequentially via the LAN 5. The sensors included in the on-vehicle sensor 4 are not limited to those described above. Further, the on-vehicle sensor 4 does not necessarily include all of the sensors described above. A kind of the on-vehicle sensor 4 that provides the HCU 1 with the detection result may be designed appropriately.

(Display Area in Display 2)

Next, a configuration of a display screen of the display 2 according to the present embodiment will be described. The HCU 1 according to the present embodiment is formed to display an image, which is obtained by overlapping an image arranged on a first layer L1 that is a frontmost layer seen from a driver with an image arranged on a second layer L2 arranged closer to a rear side than the first layer L1 seen from the driver, on the display 2. In other words, the HCU 1 manages the display screen of the display 2 by dividing into two layers of the first layer L1 and the second layer L2. The layer arranged closer to the rear side than the first layer seen from the driver corresponds to a layer at a side of a back light 2A of the display 2.

Figure 2:
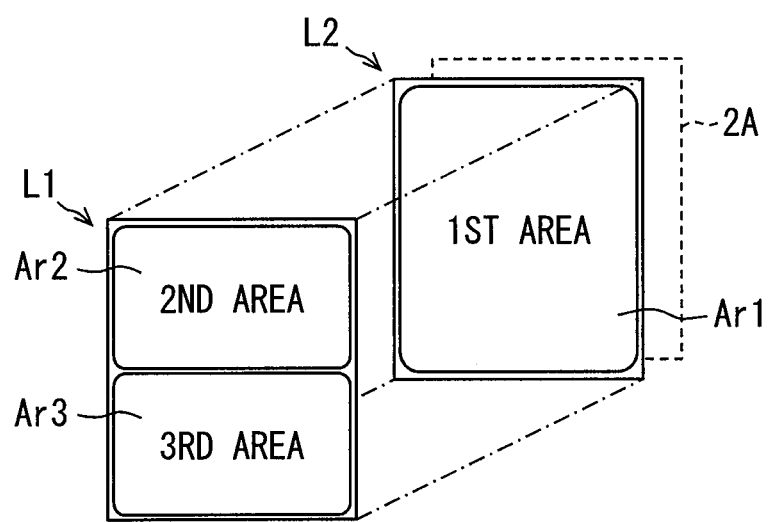
FIG. 2 is a diagram schematically illustrating a configuration of a display screen of a display.

Further, as shown in FIG. 2, the HCU 1 uses the first layer L1 and the second layer L2 to control the display screen of the display 2 virtually (in other words, by means of software) by dividing the display screen of the display 2 into three areas of a first area Ar1, a second area Ar2, and a third area Ar3. The first area Ar1 corresponds to a first display area. The second area Ar2 corresponds to a second display area. The third area Ar3 corresponds to a third display area.

The first area Ar1 is provided on the second layer L2. As one example, the whole region of the second layer is provided as the first area Ar1. Among two regions obtained by dividing the first layer L1 in a vertical direction, an upper region is provided as the second area Ar2, and a lower region is provided as the third area Ar3.

In such a configuration, when the image to be displayed in the second area Ar2 does not exist, the HCU 1 sets the second area Ar2 to be a transmitting region so that the image in a region arranged behind the second area Ar2 in the second layer L2 (in other words, the first area Ar1) is displayed on the display 2. Further, when the image to be displayed on the third area Ar3 does not exist, the HCU 1 sets the third area Ar3 to be a transmitting region so that image in a region arranged behind the third area Ar3 among the images arranged in the first area Ar1 is displayed on the display 2.

The transmitting region is a region in which a colorless and transparent image is arranged. For example, the transmitting region may be obtained by setting a parameter (so-called alfa value), which designates a degree of transparent of pixels forming the region, to 100% (namely, a completely transparent state). For the sake of convenience, not to display the information in a certain display area by setting the display area to be the transmitting region is also described that to turn off the display of the display area. On the other hand, to display the image in a certain display area is also described that to turn on the display area.

Figure 3:
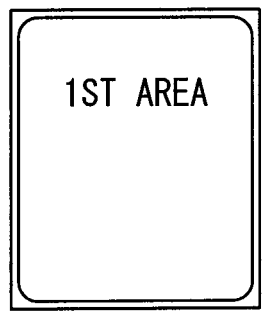
FIG. 3 is a diagram illustrating one example of a screen configuration of the display.
Figure 4:
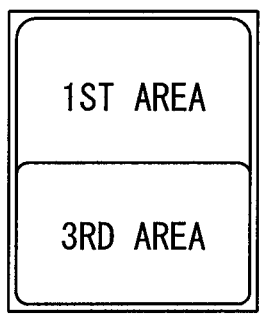
FIG. 4 is a diagram illustrating one example of the screen configuration of the display.
Figure 5:
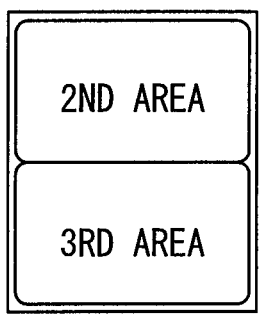
FIG. 5 is a diagram illustrating one example of the screen configuration of the display.

FIG. 3 to FIG. 5 are schematic views illustrating one example of a configuration of the display screen of the display 2 having the configuration described above. When the HCU 1 turns off the second area Ar2 and the third area Ar3, as shown in FIG. 3, the whole region of the first area Ar1 is displayed on the display 2. Further, when the HCU 1 turns off the second area Ar2 and turns on the third area Ar3, as shown in FIG. 4, the image of an upper half of the first area Ar1 and the image of the third area Ar3 are displayed on the display 2.

When the HCU 1 turns on both of the second area Ar2 and the third area Ar3, as shown in FIG. 5, the images of the second area Ar2 and the third area Ar3 are displayed on the display 2, and the image of the first area Ar1 is not displayed. Here, as one example, when the image is displayed in the second area Ar2, the image is also displayed in the third area Ar3. That is, the layout adopted as the display screen of the display 2 includes three patterns shown in FIG. 3 to FIG. 5.

(Area Rating of Each Display Area)

Area ratings, which indicate the ranking of visibility of information to a user, are assigned in advance to the three display areas described above respectively. Specifically, it will be described below.

The first area Ar1 is not shown due to the images of the second area Ar2 and the third area Ar3, and therefore the visibility of information to a user of the first area Ar1 is inferior to those of the second area Ar2 and the third area Ar3. Further, the second area Ar2 is arranged above the third area Ar3, and therefore a user (especially, a driver) can view the second area Ar2 with less movement of a visual line when the user views forward of the vehicle. In other words, the second area Ar2 is viewed more easily by the driver than the third area Ar3.

That is, the third area Ar3 is served as a display area viewed more easily by a user than the first area Ar1, and the second area Ar2 is served as a display area viewed more easily by a user than the third area Ar3. The first area Ar1 corresponds to a display area having the lowest area rating, and the second area Ar2 corresponds to a display area having the highest area rating. Further, the area rating of the third area Ar3 is between those of the first area Ar1 and the second area Ar2. The third area Ar3 is one example of a position relatively viewed easily for a driver compared to the first area Ar1. The second area Ar2 is one example of a position relatively viewed easily for a driver compared to the third area Ar3.

(Configuration and Operation of the HCU 1)

Next, a configuration and operation of the HCU 1 will be described. The HCU 1 is configured as a normal computer and includes a CPU 11, a RAM 12, a ROM 13, an I/O 14, a flash memory 15, and a bus line that connects those elements. CPU stands for Central Processing Unit, and RAM stands for Random Access Memory, and ROM stands for Read Only Memory.

The CPU 11 may be obtained by using a microprocessor or the like. A region indicated by the reference sign 111 in FIG. 1 schematically illustrates a resource portion (hereinafter, referred to as a drawing processing portion) that can be assigned for drawing of the images displayed on the display 2 among the processing capacity (so-called CPU resource) installed in the CPU 11. The drawing processing portion 111 may be obtained by using one or more processors independent from a processor that executes processing other than the drawing.

The RAM 12 is served as a main storage device (so-called memory) of the CPU 11. A storage medium served as a memory of the CPU 11 is not limited to the RAM. Another kind of the storage medium may be adopted as the RAM 12.

A program (hereinafter, referred to as a display control program) or the like that works a normal computer as the HCU 1 according to the present embodiment is stored in the ROM 13. The display control program described above may be stored in a non-transitory tangible storage media. To execute the display control program by the CPU 11 corresponds to that to execute a method corresponding to the display control program.

The I/O 14 is an interface for inputting and outputting data to and from other devices (for example, the display 2) connected to the HCU 1 via the LAN 5. The I/O 14 may be obtained by using an analogue circuit element, an IC, or the like.

The flash memory 15 is a storage medium as an auxiliary storage medium (so-called storage). The flash memory 15 may be obtained by using a rewritable nonvolatile storage medium. Various application software (hereinafter, referred to as application) for providing various functions to a user of a vehicle is installed in the flash memory 15.

Figure 6:
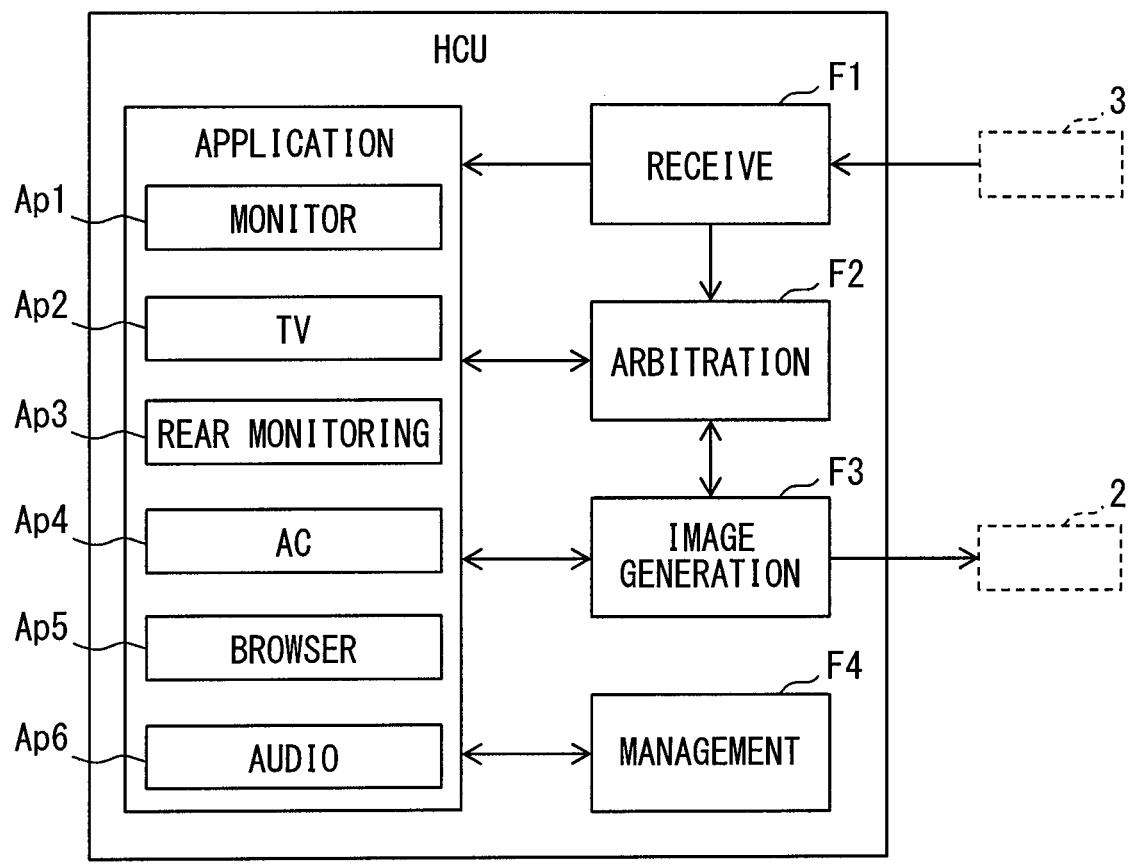
FIG. 6 is a block diagram illustrating one example of a schematic configuration of a HCU.

As one example of the present embodiment, as shown in FIG. 6, an energy monitoring application Ap1, a digital television application Ap2, a rear monitoring application Ap3, an air conditioner application Ap4, a browser application Ap5, and an audio application Ap6 are installed.

The energy monitoring application Ap1 is an application that generates an image, which indicates a flow of energy or a working state of a motor and a battery mounted on the vehicle, based on the information input from the on-vehicle sensor 4. The digital television application Ap2 is an application that displays digital television programs broadcasted from a TV station on the display 2.

The rear monitoring application Ap3 is an application that displays, on the display 2, images captured by a rear camera (not shown) that captures images of a rear area of the vehicle. The rear monitoring application Ap3 may be activated based on the user operation or activated automatically when the shift position is set in a rearward position.

The air conditioner application Ap4 is an application that executes each processing relating to switching of on/off of an air conditioner, adjusting of temperature, and adjusting of air volume by controlling operation of the air conditioner (not shown) mounted on the vehicle. The air conditioner application Ap4 displays images, which indicate setting of a target temperature, adjusting of the air volume, and an operation state, on the display 2. The browser application Ap5 is an application that allows browsing of Web sites on the internet.

The browser application Ap5 displays the Web site, which is determined by input of a user, on the display 2. The audio application Ap6 is an application that executes processing relating to playing of music contents stored in a predetermined storage medium, adjusting of sound volume, and audio output of a radio.

When each application is activated by a user, the application draws the image corresponding to the operation state of the application and provides the image to a display image generation portion F3 by using the CPU resource instructed by a display arbitration portion F2 (in other words, in cooperation with the drawing processing portion 111). Specifically, the drawing processing portion 111 draws the image based on the request from each application. Then, the display image generation portion F3 generates and displays the image to be displayed on the display 2, based on the image data provided from the application. As a result, the screen of the application corresponding to the user operation is displayed by a predetermined layout on the display 2.

A certain application screen (hereinafter, referred to as an application screen) denotes a region in which the image corresponding to the operation state of the application is displayed among the whole display region of the display 2. Examples of the application screen include a screen for receiving the command operation of a user with respect to the application, and a screen for providing predetermined information to a user as a response against the command operation of the user.

The application screen drawn by the energy monitoring application Ap1 is hereinafter described as an energy monitoring screen. Similarly, the screens drawn by the digital television application Ap2, the rear monitoring application Ap3, the air conditioner application Ap4, the browser application Ap5, and the audio application Ap6 are described as a digital television screen, a rear monitoring screen, an air conditioner screen, a browser screen, and an audio screen, respectively. The image served as the various application screens corresponds to the application image.

Among various display areas, the display area that is a display destination of the application screen is set in advance for each application in accordance with a kind of the information (in other words, the service of the application) provided to a user by the application. Data (hereinafter, application managing data) Dt indicating the display area for each application is stored in the flash memory 15.

The application managing data Dt includes data indicating whether a level of a load applied to the CPU 11 (specifically, the drawing processing portion 111) for drawing the application screen of each application is a high level or a low level, in addition to the display area for each application. The load applied to the CPU 11 for drawing the application screen corresponds to the CPU resource required to draw the application screen. For example, in a case where the required CPU resource is larger than a predetermined value, the load level may be set to the high level, and in a case where the required CPU resource is smaller than the predetermined value, the load level may be set to the low level.

In the present embodiment, as one example of the application which provides a function that a user can use in a vehicle, the air conditioner application Ap4 or the like are exemplary described, however it is not limited to those. For example, an application that provides a function corresponding to a known navigation device may be installed.

In the present embodiment, as one example, the HCU 1 includes various applications, however it is not limited to this. As another configuration, a part or a whole of various applications described below may be provided in one or more electronic control devices (hereinafter, referred to as an ECU: Electronic Control Unit) connected to the HCU 1 via the LAN 5. In other words, a function corresponding to a certain application is provided by a predetermined ECU. Further, in a case where the HCU 1 is connected to a portable terminal device, which is brought into a vehicle by a user, in a mutually communication manner, an application installed in the portable terminal device may be handled similarly to the various applications described above.

As shown in FIG. 6, the HCU 1 includes an operation receiving portion F1, the display arbitration portion F2, the display image generation portion F3, and an application managing portion F4 as a functional block obtained by the CPU 11 executing the display control program stored in the ROM 13.

The operation receiving portion F1 receives, via the input device 3, command operation of a user that changes the screen configuration of the display 2, or command operation of a user against a predetermined application. The command operation that changes the screen configuration of the display 2 is defined by operation that activates a predetermined application or terminates the active application. The contents of the operation may be specified by a control signal input from the input device 3.

For example, in a case where the touch panel is adopted as the input device 3, the operation receiving portion F1 specifies a button selected by a user among the buttons displayed on the display 2, based on the touch position signal input from the touch panel as the input device 3. Then, the operation receiving portion F1 may specify the contents of the command operation of the user from a button ID of the button selected by the user. The button denotes a screen region served as the button that receives the command operation of a user. The button ID is an identification number assigned to each button in advance and is stored in association with processing to be executed when the button is selected.

In a case where the command operation of a user against the active application is received, the received operation contents of the user are transferred to the application. In such a case, the operation contents to be transferred may be defined as, for example, a touch position in the screen corresponding to the application, the button ID of the selected button, or the like.

For the sake of convenience, hereinafter, a state where a screen corresponding to a certain application (namely, the application screen) is displayed in a predetermined display region of the display 2 is described an active state of the certain application. Further, to display the application screen of a certain application on the display 2 is also described to activate the application.

The display arbitration portion F2 executes processing that adjusts the screen configuration of the display 2 (hereinafter, referred to as display arbitration processing). An outline of the display arbitration processing will be described below. In a case where the operation contents received by the operation receiving portion F1 activate a certain application, the display arbitration portion F2 specifies the display area that is a display destination of the screen of the application to be activated, based on the application managing data Dt. Further, the display arbitration portion F2 assigns the CPU resource for drawing the application screen to the application. The application draws the application screen by using the assigned CPU resource and provides the image data corresponding to the application screen to the display image generation portion F3 sequentially.

The display image generation portion F3 arranges the image, which is provided from the application, in the display area corresponding to the application. Then, the display image generation portion F3 generates data of the image (hereinafter, referred to as a display image) to be displayed on the display 2 by overlapping the image arranged on the first layer L1 with the image arranged on the second layer L2. The image arranged on a certain layer includes a completely transparent image. The display image generation portion F3 outputs the data to the display 2 sequentially to display the image on the display 2. The display image generation portion F3 corresponds to the display processing portion.

The application managing portion F4 is a functional block that manages the information relating to the application installed in the flash memory 15. In other words, the application managing portion F4 renews the application managing data Dt.

(Application Managing Data Dt)

Next, the application managing data Dt will be described. As described above, the application managing data Dt is data that stores the display area as a display destination of the application screen and the load level for each application that works with the display arbitration portion F2. The display destination for each application is determined in accordance with a kind of information provided to a user by the application.

For example, useful information for a driver in driving a vehicle, especially information contributing to safety driving, is preferably displayed at a position where a driver can view easily. That is, the screen of the application that provides such information is preferably displayed in the second area Ar2 or the third area Ar3 having relatively high area rating.

Further, the screen of the application which provides information relating to comfortability or usability of a user may be preferably displayed in the second area Ar2 or the third area Ar3 having relatively high area rating depending on a kind of the information.

The display area for each application may be appropriately designed based on a viewpoint described above. As one example, each of the display destinations of the rear monitoring application Ap3 and the air conditioner application Ap4 is set to the second area Ar2, and each of the display destinations of the digital television application Ap2 and the audio application Ap6 is set to the third area Ar3. Each of the display destinations of the energy monitoring application Ap1 and the browser application Ap5 is set to the first area Ar1.

Figures 7, 8:
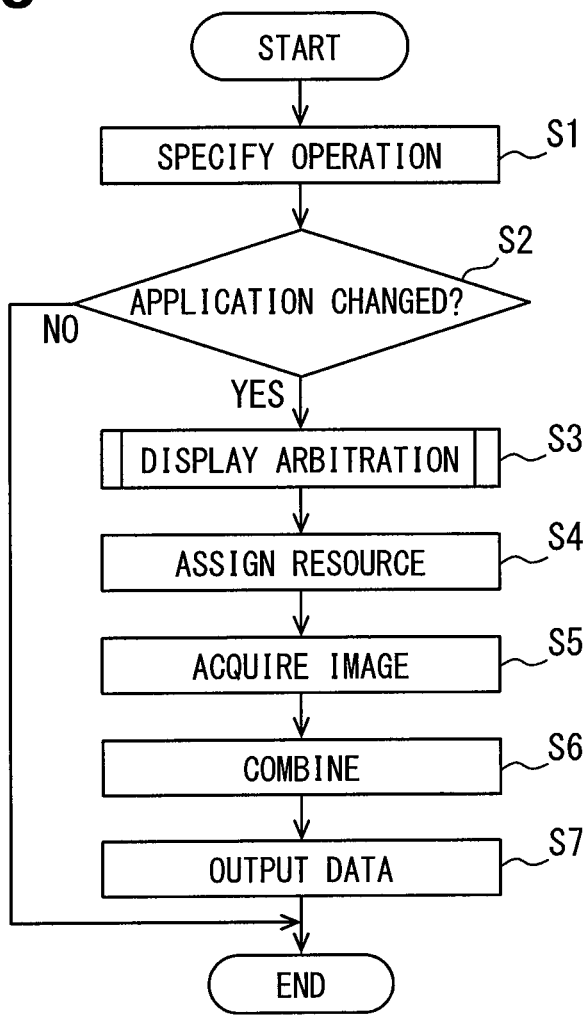
FIG. 7 is a diagram illustrating application managing data Dt.
FIG. 8 is a flowchart illustrating screen control processing executed by the HCU.
Figure 9:
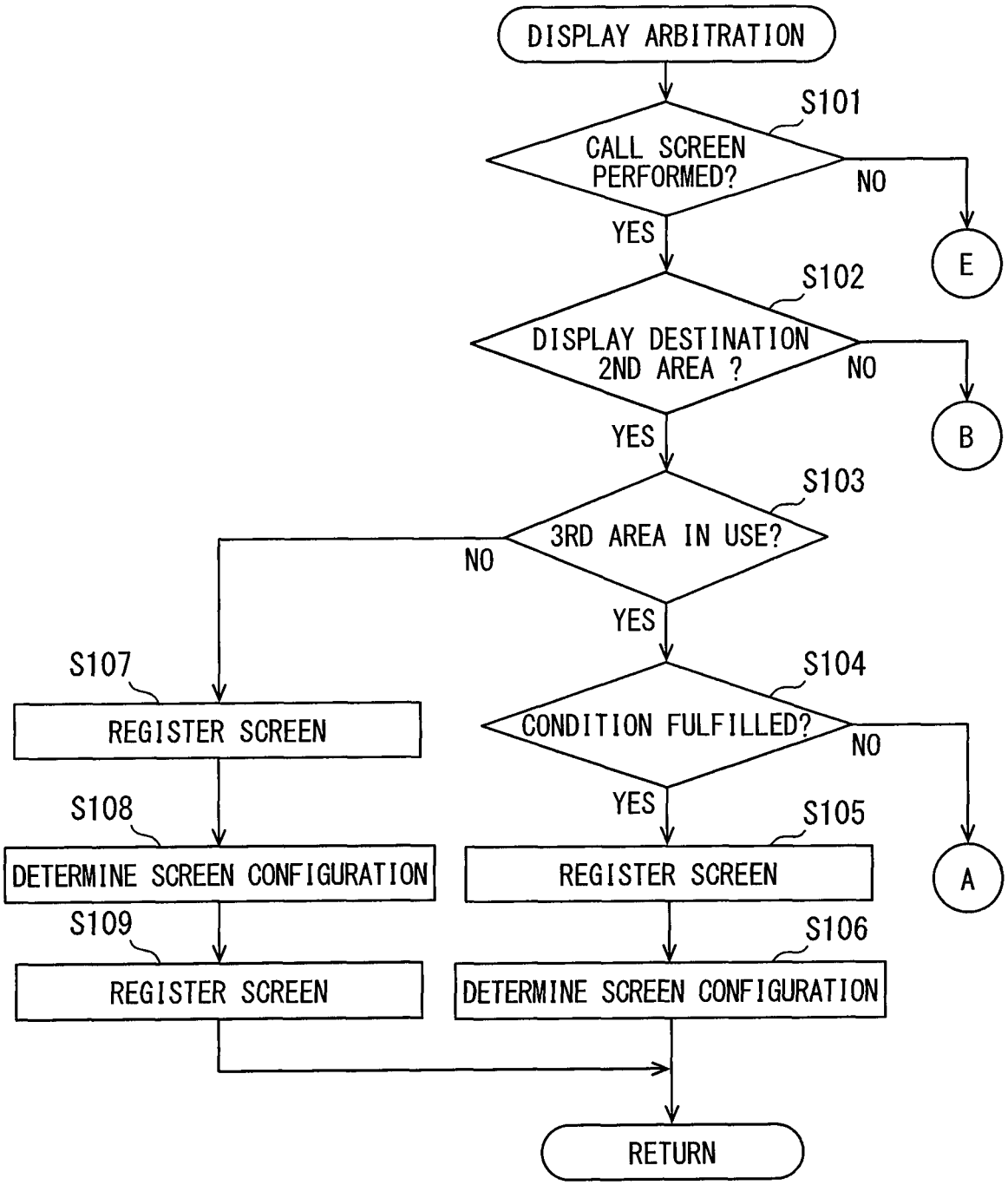
FIG. 9 is a flowchart illustrating display arbitration processing according to the first embodiment.

As shown in FIG. 7, each of the energy monitoring application Ap1, the digital television application Ap2, and the rear monitoring application Ap3 is recognized as an application with a high level in the load level. The load level of each application may be acquired as information of the application from a distribution source of the application when installed or may be set in advance by a designer or the like of the HCU 1.

Further, the load level of each application may be determined by the application managing portion F4 by using an average or a median of the loads when the application is actually executed several times. In such a case, the load level may be set to a high level in an initial state. That is, the load level of the application is set to a high level in the initial state, and then in a case where the load level is determined as a low level based on a result after executing the application several times, the load level of the application may be changed to a low level. The determination or the renewal of the setting may be executed by the application managing portion F4.

The application managing data Dt may be updated by the application managing portion F4 when a new application is installed or the application is uninstalled. The display area of each application may be assigned by a user.

(Screen Control Processing)

Next, processing of controlling the screen configuration of the display 2 (hereinafter referred to as screen control processing), executed by the HCU 1 based on the command operation input by a user will be described with reference to a flowchart shown in FIG. 8. The flowchart shown in FIG. 8 may be started, for example, when a control signal (for example, a touch position signal) indicating the input of the command operation of a user is input from the input device 3.

At first, in S1, the operation receiving portion F1 specifies the command operation of a user, based on the control signal input from the input device 3 and informs the specified command contents to the application corresponding to the operation (in other words, an operation target application). When the processing of S1 is completed, the procedure proceeds to S2.

In S2, the display arbitration portion F2 determines whether the operation specified in S1 is the operation that changes the screen configuration of the display 2. The screen configuration includes not only a combination of the display areas to be in an on-state but also a combination of the applications to be in an active state. That is, the operation that changes the screen configuration of the display 2 corresponds to operation that changes the application to be in the active state.

In a case where the operation specified in S1 is the operation that changes the screen configuration of the display 2, positive determination is made in S2 and the procedure proceeds to S3. On the other hand, in a case where the operation received in S1 is not the operation that changes the screen configuration of the display 2, negative determination is made in S2 and the present flow is ended.

In S3, the display arbitration portion F2 executes the display arbitration processing shown in FIG. 9 to FIG. 15, and the procedure proceeds to S4. Although the details are described below, the display area to be in the on-state or the application to be in the active state is determined by executing the display arbitration processing.

In S4, assignment of the CPU resource against the application to be in the active state is determined. In a case where the multiple applications is to be the active state, the CPU resource is preferentially assigned to the application to be displayed in the display area having the high area rating. In other words, the CPU resource is assigned such that the image of the display area having the high area rating is preferentially drawn. For example, in a case where the application to be displayed in the second area Ar2 and the application to be displayed in the third area Ar3 are active, the CPU resource is preferentially assigned to the application to be displayed in the second area Ar2.

When the user operation that changes the display screen of the display area having a relatively low area rating is received in a state where all CPU resources are assigned to the screen drawing for the display area having a relatively high area rating, it is likely that the CPU resource is not assigned to the drawing of the screen of the display area having the lower area rating at all. In such a case, since the screen of the display area having the lower area rating is not drawn once, a user recognizes that the screen configuration is not changed, and thereby the user may feel the sense of discomfort.

Accordingly, while the CPU resource is basically assigned preferentially to the application that draws the screen of the display area having the higher area rating, the minimum CPU resource is preferably assigned to the application that draws the screen of the display area having the lower area rating. The minimum CPU resource is a CPU resource that executes update of the screen of the display area at least once in accordance with the user operation that changes the display screen of the display area having the lower area rating.

For example, in a case where the user operation that changes the display screen of the display area having the lower area rating is received, the display screen having the lower area rating may be updated to a new display screen at the timing when a 1 Vsync signal is output after receiving the user operation. Of course, as another configuration, the minimum CPU resource may be set to a CPU resource for several fps. According to such a configuration, the screen of the display area having the lower area rating is also updated at least several times per one second.

Each application to which the CPU resource is assigned generates the application screen by using the assigned CPU resource and sequentially provides the image data corresponding to the generated application screen to the display image generation portion F3.

In S5, the display image generation portion F3 acquires the image from each active application, and the procedure proceeds to S6. In S6, the display image generation portion F3 generates the image data (namely, display image data) arranged in the corresponding display area from the image data provided from each application and displays the image data on the display 2, and the present flow is ended. The processing of S5 to S7 may be sequentially executed until the command operation that changes the screen configuration is newly received or the power source of a vehicle is turned off.

(Display Arbitration Processing)

Next, the display arbitration processing executed by the display arbitration portion F2 will be described with reference to flowcharts shown in FIG. 9 to FIG. 15. The flowchart shown in FIG. 9 may be started when the procedure proceeds to S3 shown in FIG. 8.

At first, in S101, it is determined whether the operation received in S1 shown in FIG. 8 is the operation that turns the non-active application into the active state. In other words, it is determined whether the operation received in S1 is the operation for newly displaying the screen of a predetermined application (hereinafter, referred to as screen call operation). In a case where the operation received in S1 is the screen call operation, positive determination is made in S101 and the procedure proceeds to S102. On the other hand, the operation received in S1 is not the screen call operation, negative determination is made in S101 and the procedure proceeds to S150 shown in FIG. 14.

A case where the display arbitration processing is executed means a case where the operation received in S1 changes at least the screen configuration of the display 2. Accordingly, the case where the negative determination is made in S101 means a case where the operation received in S1 terminates any application among the active applications. In particularly, in the present embodiment, operation that terminates the application to be displayed in the first area Ar1 is not received. Thus, the case where the negative determination is made in S101 means that the operation received in S1 terminates the application for the second area Ar2 or the application for the third area Ar3.

In S102, it is determined whether the display destination of the screen of the application to be activated based on the user operation is the second area Ar2 by referring to the application managing data Dt. In a case where the display destination of the screen of the application screen to be activated is the second area Ar2, positive determination is made in S102 and the procedure proceeds to S103. On the other hand, the display destination of the screen of the application to be activated is not the second area Ar2, negative determination is made in S102 and the procedure proceeds to S120 shown in FIG. 11.

In S103, it is determined whether the third area Ar3 is turned on. In a case where the third area Ar3 is turned on, positive determination is made in S103 and the procedure proceeds to S104. On the other hand, the third area Ar3 is turned off, negative determination is made in S103 and the procedure proceeds to S107.

In S104, it is determined whether a predetermined third area retraction condition is fulfilled. The third area retraction condition is a condition for retracting the screen presently displayed in the third area Ar3 and displaying a predetermined low load screen described below in the third area Ar3. A case where the third area retraction condition is fulfilled is a case where the drawing load of the screen corresponding to the application to be activated at this time (hereinafter, referred to as a call screen) is in a high level and the load for drawing the screen presently displayed in the third area Ar3 is also in a high level.

Whether the drawing load of the screen displayed in a certain display area is in a high level is determined based on the application managing data Dt. For example, in a case where the load level of the application that is presently drawing the screen for the third area Ar3 is set to a high level in the application managing data Dt, it is determined that the drawing load of the screen presently displayed in the third area Ar3 is in a high level. The drawing load of the call screen may be similarly determined based on the application managing data Dt. The image drawn as the screen of the application set in a high level in the load level corresponds to the high load application image.

In a case where the third area retraction condition is fulfilled, positive determination is made in S104 and the procedure proceeds to S105. On the other hand, in a case where the third area retraction condition is not fulfilled, negative determination is made in S104 and the procedure proceeds to S110 shown in FIG. 10.

In S105, the screen presently displayed in the third area Ar3 is registered in a retraction list, and the procedure proceeds to S106. The retraction list is a list of the screens in which the display thereof to the display 2 (in other words, the drawing processing by the application) is temporarily interrupted in order to avoid increasing of the drawing load.

The retraction list may be formed to store the screen ID of the retracted screen. The screen ID is a specific identification number of each application (in other words, each screen) to be distinguished from another application screen. Of course, it is preferable that the retraction list also stores the image data of the retracted screen or the like in association with the screen ID of the retracted screen in order to display the retracted screen again. It is preferable that the retraction list stores the screen ID of the retracted screen in association with the information indicating the display area in which the retracted screen has been displayed. The retraction list may be obtained by using, for example, a storage region provided in the RAM 12.

Hereinafter, for the sake of convenience, the screen retracted from the third display area Ar3 is also described as a retracted third area screen.

In S106, the screen configuration of the display 2 after the present flow is determined. Specifically, it is determined to turn off the first area Ar1, to arrange the call screen in the second area Ar2, and to display a predetermined screen having a low level in the drawing load (hereinafter, referred to as a low load screen) in the third area Ar3, instead of the presently displayed screen. The low load screen may be set in advance. For example, the low load screen for the third area Ar3 may be an audio screen. Alternatively, the low load screen for the third area Ar3 may be a screen showing a list of usable applications by a user (hereinafter, referred to as a menu screen). The image data of the menu screen may be generated by the display image generation portion F3. The contents of the low load screen for the third area Ar3 may be appropriately designed.

In S107, the screen presently displayed in the first area Ar1 is registered in the retraction list, and the procedure proceeds to S108. In a case where the second area Ar2 is turned on when the present flow is started, the procedure may proceed to S108 by omitting S107. This is because the first area Ar1 is turned off when the second area Ar2 is turned on.

In S108, it is determined to turn off the first area Ar1 and to arrange the call screen in the second area Ar2 and to display the low load screen in the third area Ar3 as the screen configuration of the display 2, and the procedure proceeds to S109.

In S109, it is stored by using a flag or the like that the screen to be displayed in the third area Ar3 is formed as a linking display screen. When the processing of S109 is completed, the procedure returns to the display control processing, which is the caller of the present flow, shown in FIG. 8, and then S5 is executed (namely, the procedure is returned). The linking display screen is a screen displayed in the third area Ar3 linking with turning of the second area Ar2 into the on-state.

Figure 10:
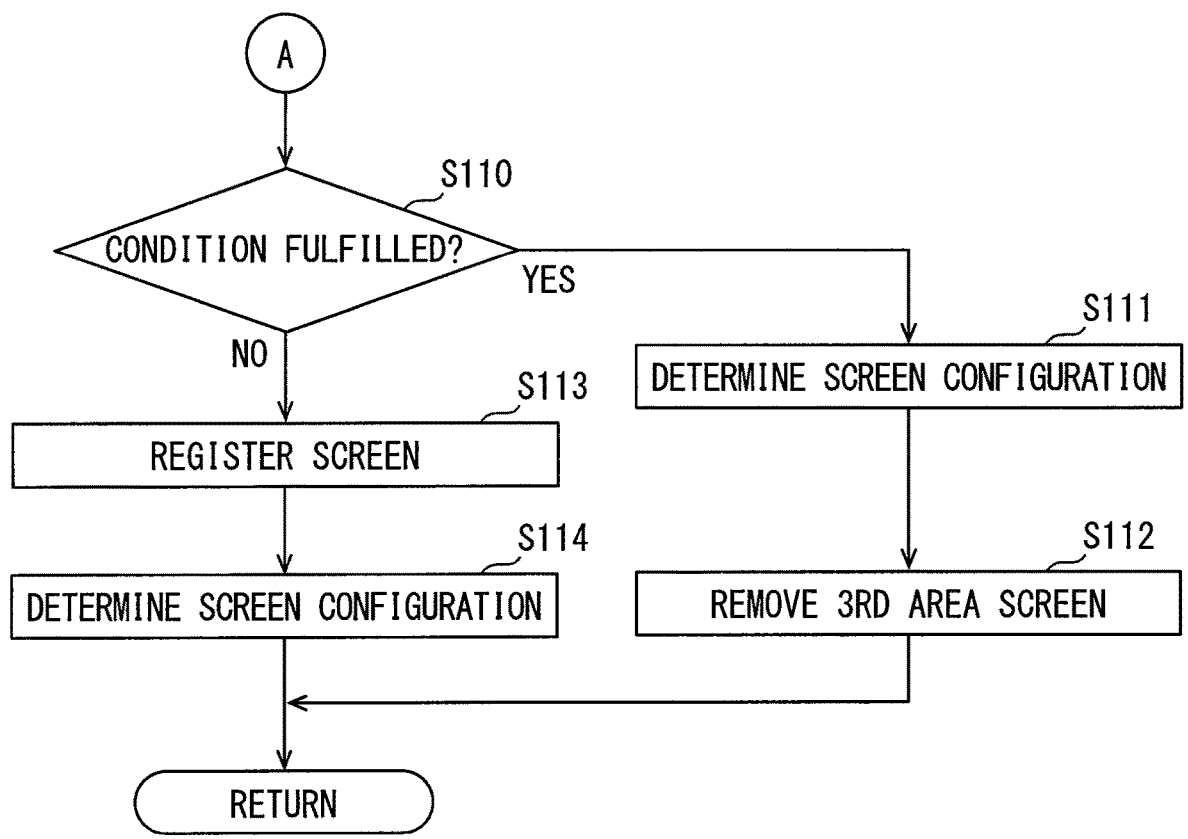
FIG. 10 is a flowchart illustrating a continuation of the flowchart shown in FIG. 9.

In S110 shown in FIG. 10, it is determined whether a predetermined third area return condition is fulfilled. The third area return condition is a condition in which the retracted third area screen is returned (in other words, is re-displayed). A case where the third area return condition is fulfilled means a case where the drawing load of the call screen to be displayed in the second area Ar2 is in a low level and the retracted third area screen exists. Whether the retracted third area screen exists may be determined by referring to the retraction list.

In a case where the third area return condition is fulfilled, positive determination is made in S110, and the procedure proceeds to S111. On the other hand, in a case where the third area return condition is not fulfilled, negative determination is made in S110 and the procedure proceeds to S113.

In S111, it is determined to turn off the first area Ar1, to arrange the call screen in the second area Ar2, and to display the retracted third area screen in the third area Ar3 as the screen configuration of the display 2, and the procedure proceeds to S112. In S112, the data of the third area screen that is determined to be returned in S111 is removed from the retraction list, and the procedure returns to the caller.

In S113, the screen presently displayed in the first area Ar1 is registered in the retraction list, and the procedure proceeds to S114. In S114, it is determined to turn off the first area Ar1, to arrange the call screen in the second area Ar2, and to display the low load screen for the third area Ar3 in the third area Ar3 as the screen configuration of the display 2. Then, the procedure returns to the caller.

Figure 11:
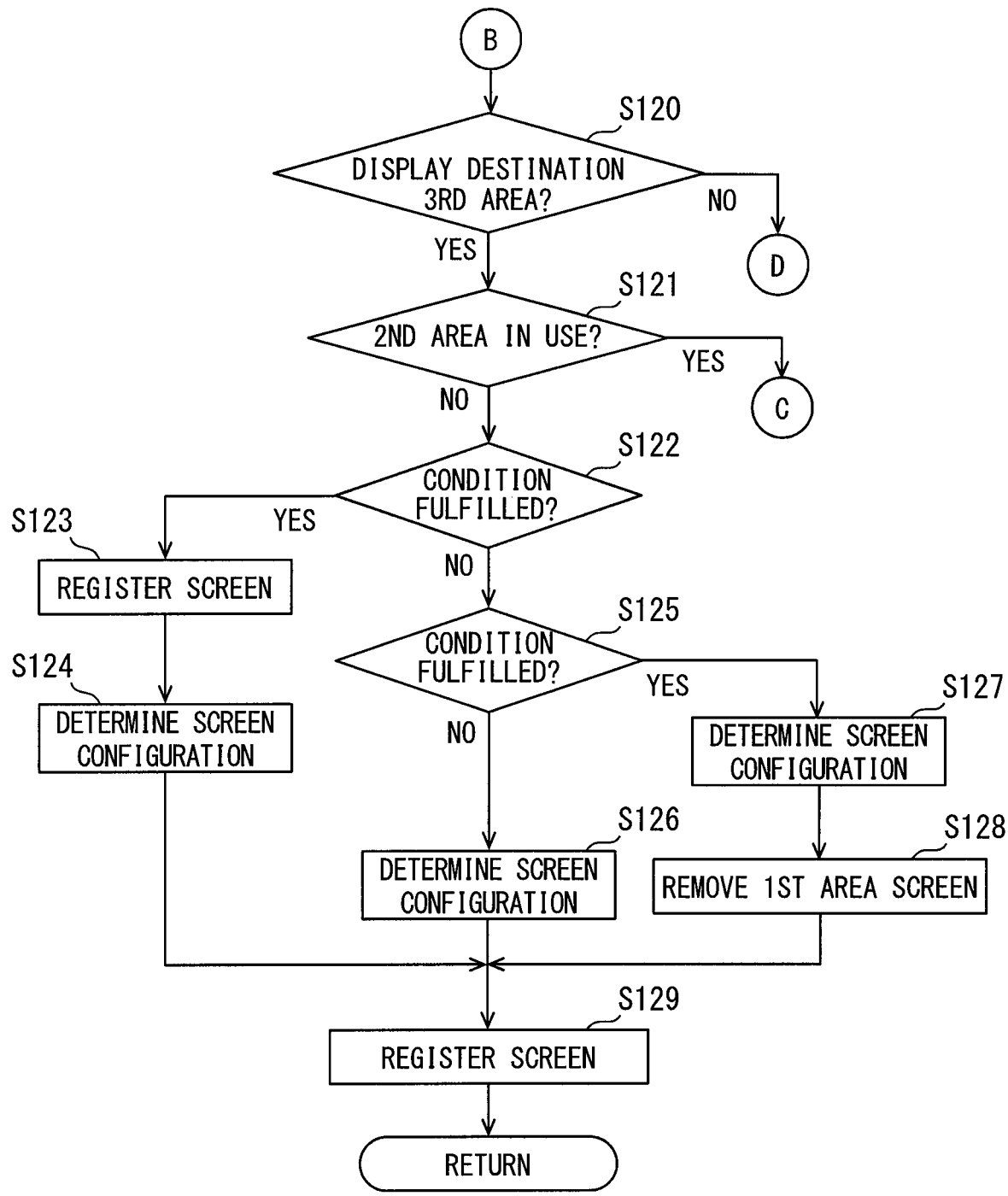
FIG. 11 is a flowchart illustrating a continuation of the flowchart shown in FIG. 9.

In S120 shown in FIG. 11, it is determined whether the display destination of the screen of the application to be activated is the third area Ar3 by referring to the application managing data Dt. In a case where the display destination of the screen of the application to be activated is the third area Ar3, positive determination is made in S120, and the procedure proceeds to S121. On the other hand, in a case where the display destination of the screen of the application to be activated is not the third area Ar3, negative determination is made in S120, and the procedure proceeds to S140 shown in FIG. 13.

In S121, it is determined whether the second area Ar2 is presently turned on. In a case where the second area Ar2 is turned on, positive determination is made in S121, and the procedure proceeds to S130 shown in FIG. 12. On the other hand, in a case where the second area Ar2 is turned off, negative determination is made in S121, and the procedure proceeds to S122.

In S122, it is determined whether a predetermined first area retraction condition is fulfilled. The first area retraction condition is a condition in which the screen presently displayed in the first area Ar1 is retracted and a predetermined low load screen for the first area Ar1 is displayed in the first area Ar1. A case where the first area retraction condition is fulfilled means a case where the drawing load of the call screen to be displayed in the second area Ar2 at this time is in a high level and the drawing load of the screen presently displayed in the first area Ar1 is also in a high level.

The low load screen for the first area Ar1 may be set in advance similarly to the low load screen for the third area Ar3. For example, the low load screen in the first area Ar1 may be set to a menu screen in accordance with a size of the first area Ar1. Alternatively, the low load screen in the first area Ar1 may be set to a predetermined background image or the like. The contents of the low load screen for the first area Ar1 may be appropriately designed.

In a case where the first area retraction condition is fulfilled, positive determination is made in S122, and the procedure proceeds to S123. On the other hand, in a case where the first area retraction condition is not fulfilled, negative determination is made in S122, and the procedure proceeds to S125.

In S123, the screen presently displayed in the first area Ar1 is registered in the retraction list, and the procedure proceeds to S124. Hereinafter, for the sake of convenience, the screen retracted from the first area Ar1 is also described as a retracted first area screen.

In S124, it is determined to display the low load screen for the first area Ar1 in the first area Ar1 and to arrange the call screen in the third area Ar3 as the screen configuration of the display 2, and the procedure proceeds to S129. The second area Ar2 is kept in an off-state.

In S125, it is determined whether a predetermined first area return condition is fulfilled. The first area return condition is a condition in which the retracted first area screen is returned (namely, is re-displayed). A case where the first area return condition is fulfilled is a case where the drawing load of the call screen to be newly displayed in the third area Ar3 is in a low level and the retracted first area screen exists. Whether the retracted first area screen exists may be determined by referring to the retraction list.

In a case where the first area return condition is fulfilled, positive determination is made in S125, and the procedure proceeds to S127. On the other hand, in a case where the first area return condition is not fulfilled, negative determination is made in S125, and the procedure proceeds to S126.

In S126, it is determined to keep the screen presently displayed in the first area Ar1 and to arrange the call screen in the third area Ar3 as the screen configuration of the display 2, and the procedure proceeds to S129. The second area Ar2 is kept in the off-state.

In S127, it is determined to return the retracted first area screen in the first area Ar1, to keep the off-state of the second area Ar2, and to arrange the call screen in the third area Ar3 as the screen configuration of the display 2, and the procedure proceeds to S128. In S128, the data of the first area screen that is determined to be returned is removed from the retraction list, and the procedure proceeds to S129.

In S129, the screen presently displayed in the third area Ar3 is registered in the retraction list, and the procedure returns to the caller. However, in a case where the screen presently displayed in the third area Ar3 is the linking display screen, the screen is not registered in the retraction list, and the procedure returns to the caller.

Figure 12:
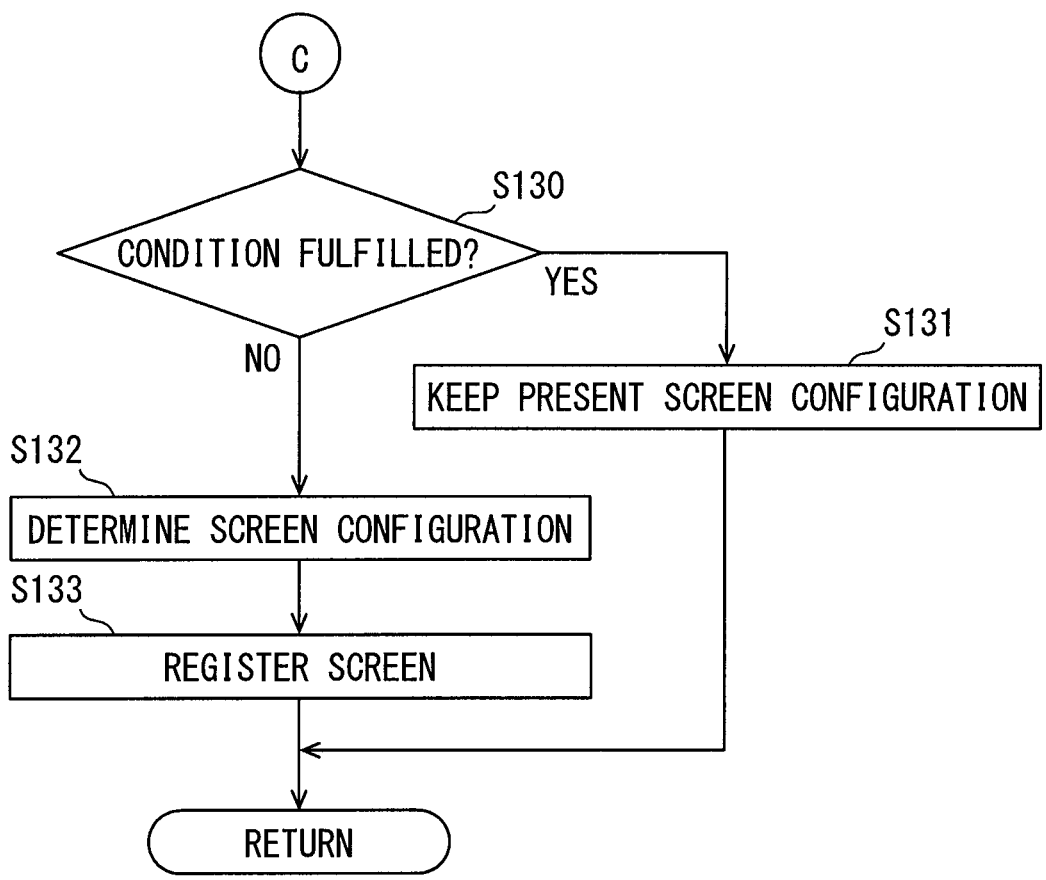
FIG. 12 is a flowchart illustrating a continuation of the flowchart shown in FIG. 11.

In S130 shown in FIG. 12, it is determined whether a predetermined third area switching request discard condition is fulfilled. The third area switching request discard condition is a condition in which the user operation that switches the display screen of the third area Ar3 is discarded and the present screen configuration of the display 2 is kept. A case where the third area switching request discard condition is fulfilled denotes a case where the screen set in a high level in the drawing load is presently displayed in the second area Ar2 and the drawing load of the call screen to be displayed in the third area Ar3 is also set in a high level.

In a case where the third area switching request discard condition is fulfilled, positive determination is made in S130, and the procedure proceeds to S131. On the other hand, in a case where the third area switching request discard condition is not fulfilled, negative determination is made in S130, and the procedure proceeds to S132.

In S131, it is determined to keep the present screen configuration, and the procedure returns to the caller. Since the area rating of the second area Ar2 is higher than the area rating of the third area Ar3, the screen that is more useful for a user is displayed in the second area Ar2. Accordingly, in a case where the drawing performance of the screen of the second area might be deteriorated when the CPU resource is tightened due to the switching operation of the display screen of the third area Ar3, the drawing performance of the screen of the second area can be secured by discarding the switching request. That is, according to such a configuration, the drawing of more useful screen can be secured.

In S132, it is determined to keep the off-state of the first area Ar1 and to keep the display of the screen presently displayed in the second area Ar2 and to display the call screen in the third area Ar3 as the screen configuration of the display 2, and the procedure proceeds to S133.

In S133, similar to S129, the screen presently displayed in the third area Ar3 is registered in the retraction list, and the procedure returns to the caller. However, in a case where the screen presently displayed in the third area Ar3 is the linking display screen, the screen presently displayed in the third area Ar3 is not registered in the retraction list, and the procedure returns to the caller.

Figure 13:
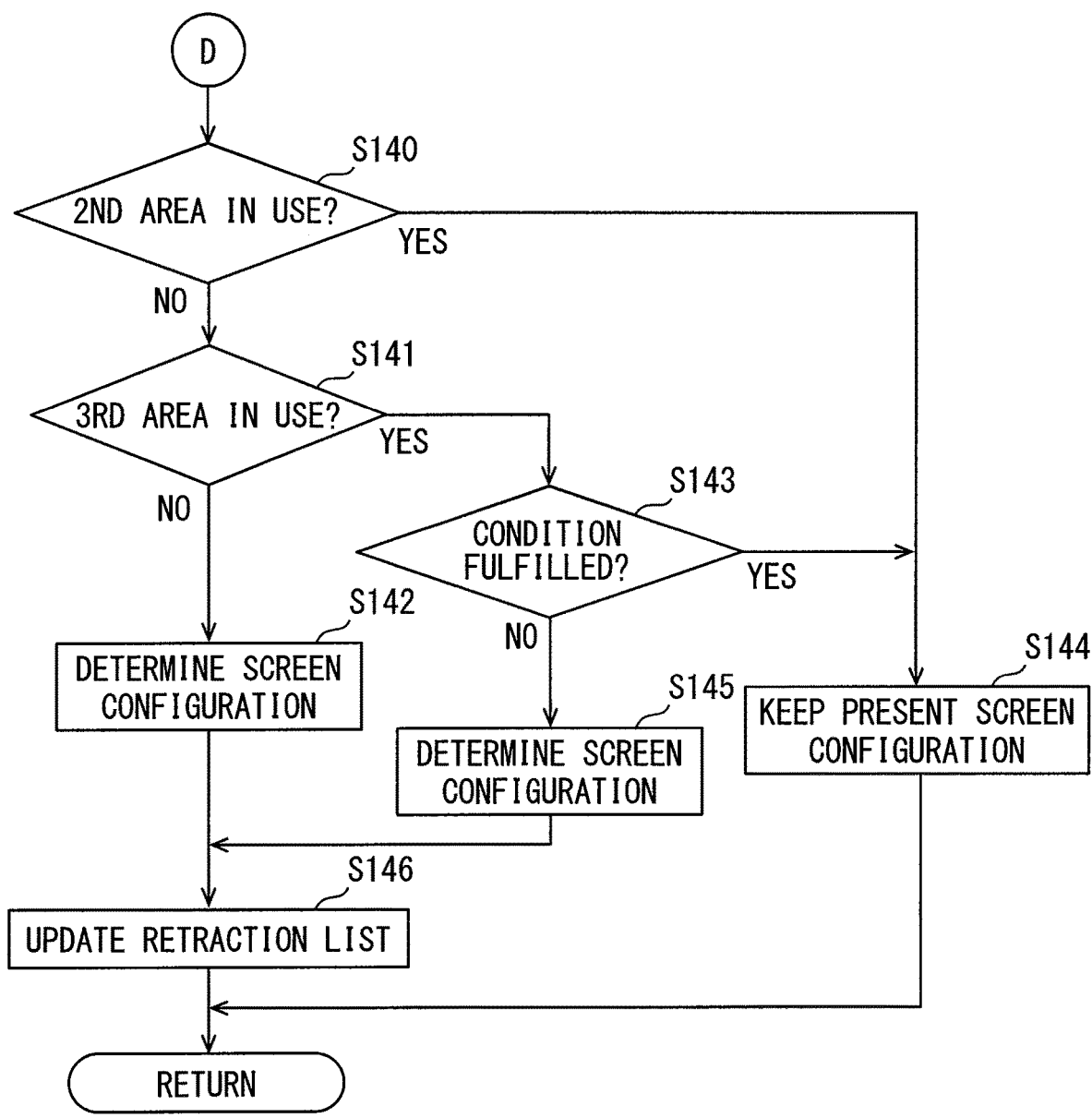
FIG. 13 is a flowchart illustrating a continuation of the flowchart shown in FIG. 11.

In S140 shown in FIG. 13, it is determined whether the second area Ar2 is presently turned on. A case where the determination processing of S140 is executed denotes a case where the display destination of the screen of the application to be activated is set to the first area Ar1.

In a case where the second area Ar2 is turned on, positive determination is made in S140, and the procedure proceeds to S144. On the other hand, the second area Ar2 is turned off, negative determination is made in S140, and the procedure proceeds to S141.

In S141, it is determined whether the third area Ar3 is presently turned on. In a case where the third area Ar3 is turned on, positive determination is made in S141, and the procedure proceeds to S143. On the other hand, in a case where the third area Ar3 is turned off, negative determination is made in S141, and the procedure proceeds to S142.

In S142, it is determined to display the call screen in the first area Ar1 and to keep the off-state of the second area Ar2 and the third area Ar3 as the screen configuration of the display 2, and the procedure proceeds to S146.

In S143, it is determined whether a predetermined first area switching request discard condition is fulfilled. The first area switching request discard condition is a condition in which the command that is input from a user and switches the display screen of the first area Ar1 is discarded and the present screen configuration of the display 2 is kept. A case where the first area switching request discard condition is fulfilled denotes a case where the screen set in a high level in the drawing load is presently displayed in the third area Ar3 and the drawing load of the call screen to be displayed in the first area Ar1 is also set in a high level.

In a case where the first area switching request discard condition is fulfilled, positive determination is made in S143, and the procedure proceeds to S144. On the other hand, in a case where the first area switching request discard condition is not fulfilled, negative determination is made in S143, and the procedure proceeds to S145.

In S144, it is determined to keep the present screen configuration, and the procedure returns to the caller. That is, the call command of the application is discarded. The call command is input by a user and have the display destination of the screen set to the first area Ar1.

Since each of the area ratings of the second area Ar2 and the third area Ar3 is higher than the area rating of the first area Ar1, the screen that is more useful for a user is displayed in the second area Ar2 and the third area Ar3 compared to the first area Ar1. Accordingly, for example, in a case where the second area Ar2 is turned on, the display of more useful screen can be kept by discarding the command operation which requests to display a predetermined application screen in the first area Ar1. It is similarly executed in a case where the high load screen is displayed in the third area Ar3.

In S145, it is determined to display the call screen in the first area Ar1, to keep the off-state of the second area Ar2, and to keep the display of the screen presently displayed in the third area Ar3 as the screen configuration of the display 2, and the procedure proceeds to S146.

In S146, data update of the retraction list is executed, and the procedure returns to the caller. Specifically, in a case where the first area screen is registered in the retraction list, the data of the first area screen is removed.

Figure 14:
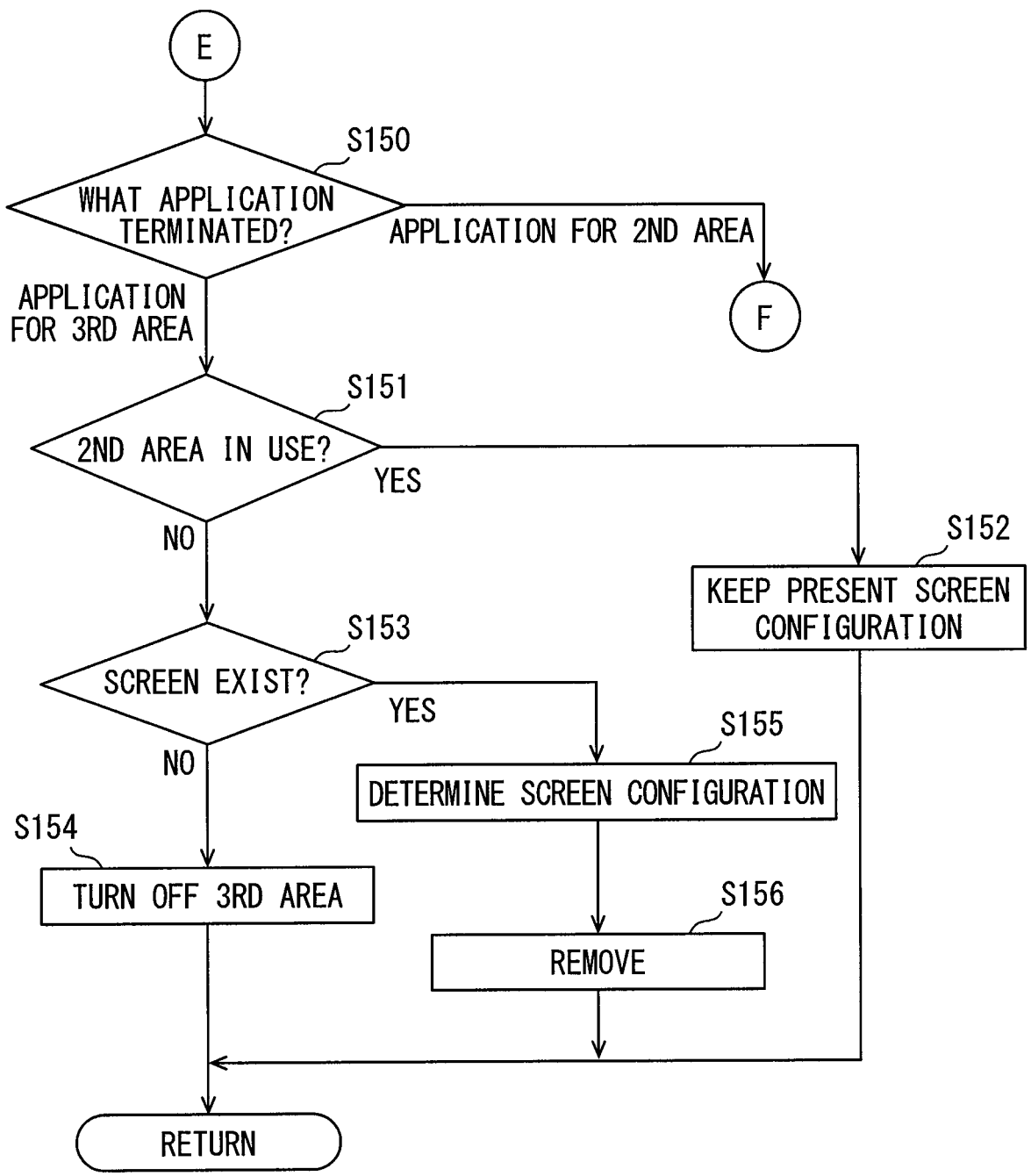
FIG. 14 is a flowchart illustrating a continuation of the flowchart shown in FIG. 9.

Next, a flow after S150 shown in FIG. 14 will be described. A case where the procedure proceeds to S150 from S101 denotes a case where the operation received in S1 is the operation that terminates the application for the second area Ar2 or the operation that terminates the application for the third area Ar3.

At first, in S150, it is determined whether the display destination of the screen of the application to be terminated based on the user operation is the second area Ar2 or the third area Ar3. In a case where the display destination of the screen of the application to be terminated at this time is the second area Ar2, the procedure proceeds to S160. On the other hand, in a case where the display destination of the screen of the application to be terminated at this time is the third area Ar3, the procedure proceeds to S151.

In S151, it is determined whether the second area Ar2 is presently turned on. In a case where the second area Ar2 is turned on, positive determination is made in S151, and the procedure proceeds to S152. On the other hand, in a case where the second area Ar2 is turned off, negative determination is made in S151, and the procedure proceeds to S153.

In S152, it is determined to keep the present screen configuration, and the procedure returns to the caller. As another configuration, in S152, it may be determined to arrange the low load screen for the third area Ar3 instead of the screen presently displayed in the third area Ar3 and the procedure returns to the caller. According to such a configuration, a user can recognize that the operation that is input by the user and terminates the application corresponding to the third area Ar3 is executed based on the switching of the screen displayed in the third area Ar3. Further, by displaying the predetermined low load screen as a substitutional screen, the load of the CPU 11 can be suppressed.

In S153, it is determined whether the retracted first area screen exists by referring to the retraction list. In a case where the retracted first area screen exists, positive determination is made in S153, and the procedure proceeds to S155. On the other hand, in a case where the retracted first area screen does not exist, negative determination is made in S153, and the procedure proceeds to S154.

In S154, the third area Ar3 is set to be turned off, and the procedure returns to the caller. The display of the screen presently displayed in the first area Ar1 is kept. Further, in addition to the processing of S154, the screen drawing processing executed by the application which is drawing the screen for the third area Ar3 is stopped.

In S155, it is determined to return the retracted first area screen to the first area Ar1 and to turn off the third area Ar3 as a screen configuration of the display 2, and the procedure proceeds to S156. The off-state of the second area Ar2 is kept. In S156, the data of the first area screen, which is determined in S155 to be returned, is removed from the retraction list, and the procedure returns to the caller.

Figure 15:
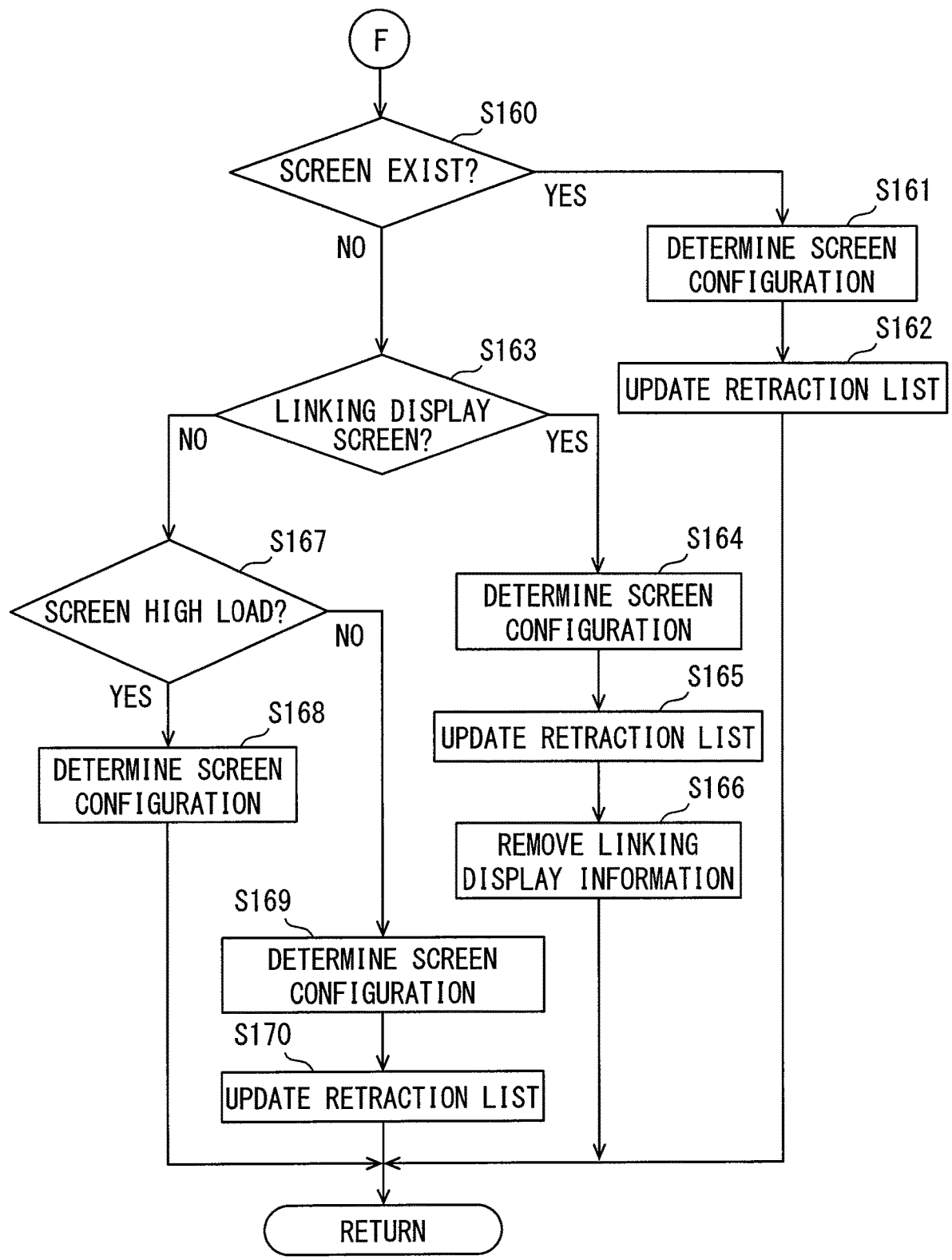
FIG. 15 is a flowchart illustrating a continuation of the flowchart shown in FIG. 14.

In S160 shown in FIG. 15, it is determined whether the retracted third area screen exists by referring to the retraction list. In a case where the retracted third area screen exists, positive determination is made in S160, and the procedure proceeds to S161. On the other hand, in a case where the retracted third area screen does not exist, negative determination is made in S160, and the procedure proceeds to S163.

A case where the determination processing of S160 is executed is a case where the second area Ar2 and the third area Ar3 are turned on and the user operation that terminates the application drawing the screen for the second area Ar2 is received. When the second area Ar2 and the third area Ar3 are turned on, the first area screen is registered in the retraction list. That is, as a premise of executing S160, the first area screen is registered in the retraction list.

In S161, it is determined to display the low load screen for the first area Ar1 in the first area Ar1 and to turn off the second area Ar2 and to return the retracted third area screen in the third area Ar3 as the screen configuration of the display 2, and the procedure proceeds to S162. In S162, the data of the third area screen, which is determined in S161 to be returned, is removed from the retraction list, and the procedure returns to the caller.

In S163, it is determined whether the screen presently displayed in the third area Ar3 is the linking display screen. In a case where the screen presently displayed in the third area Ar3 is the linking display screen, positive determination is made in S163, and the procedure proceeds to S164. On the other hand, in a case where the screen presently displayed in the third area Ar3 is not the linking display screen, negative determination is made in S163, and the procedure proceeds to S167.

In S164, it is determined to return the retracted first area screen to the first area Ar1 and to turn off the second area Ar2 and the third area Ar3 as the screen configuration of the display 2, and the procedure proceeds to S165.

In S165, the data of the first area screen, which is determined in S155 to be returned, is removed from the retraction list, and the procedure proceeds to S166. In S166, the flag indicating whether the screen displayed in the third area Ar3 is linking display screen is initialized. A state where the flag is initialized may denote a state indicating that the screen displayed in the third area Ar3 is not the linking display screen. When the processing of S166 is completed, the procedure returns to the caller.

In S167, it is determined whether the screen presently displayed in the third area Ar3 is a screen set to a high level in the drawing load. In a case where the screen presently displayed in the third area Ar3 is the screen set to a high level in the drawing load, positive determination is made in S167, and the procedure proceeds to S168. On the other hand, in a case where the screen presently displayed in the third area Ar3 is not the screen set to a high level in the drawing load, negative determination is made in S167, and the procedure proceeds to S169.

In S168, it is determined to arrange the low load screen for the first area Ar1 in the first area Ar1, to turn off the second area Ar2, and to continuously display the screen presently displayed in the third area Ar3 as the screen configuration of the display 2, and the procedure returns to the caller.

In S169, it is determined to return the retracted first area screen to the first area Ar1 and to turn off the second area Ar2 and to keep the display of the screen presently displayed in the third area Ar3 as the screen configuration of the display 2. Then, the procedure proceeds to S170.

In S170, the data of the first area screen, which is determined in S169 to be returned, is removed from the retraction list, and the procedure returns to the caller.

By executing the display arbitration processing described above, a combination of the display area to be in the on-state and the application, the image of which is to be displayed in the display area, to be in the on-state is determined. In other words, as a response against the user operation received by the operation receiving portion F1, the application to be in an active state is determined. Then, in a case where the multiple applications to be in the active state exists, the CPU resource is preferentially assigned to the application corresponding to the display area having the high area rating.

(Screen Control Executed by the HCU 1)

Next, three examples of a switching configuration for the screen configuration executed by the HCU 1 described above will be described with reference to FIG. 16 to FIG. 18. At first, one example of the switching configuration shown in FIG. 16 will be described.

Figure 16:
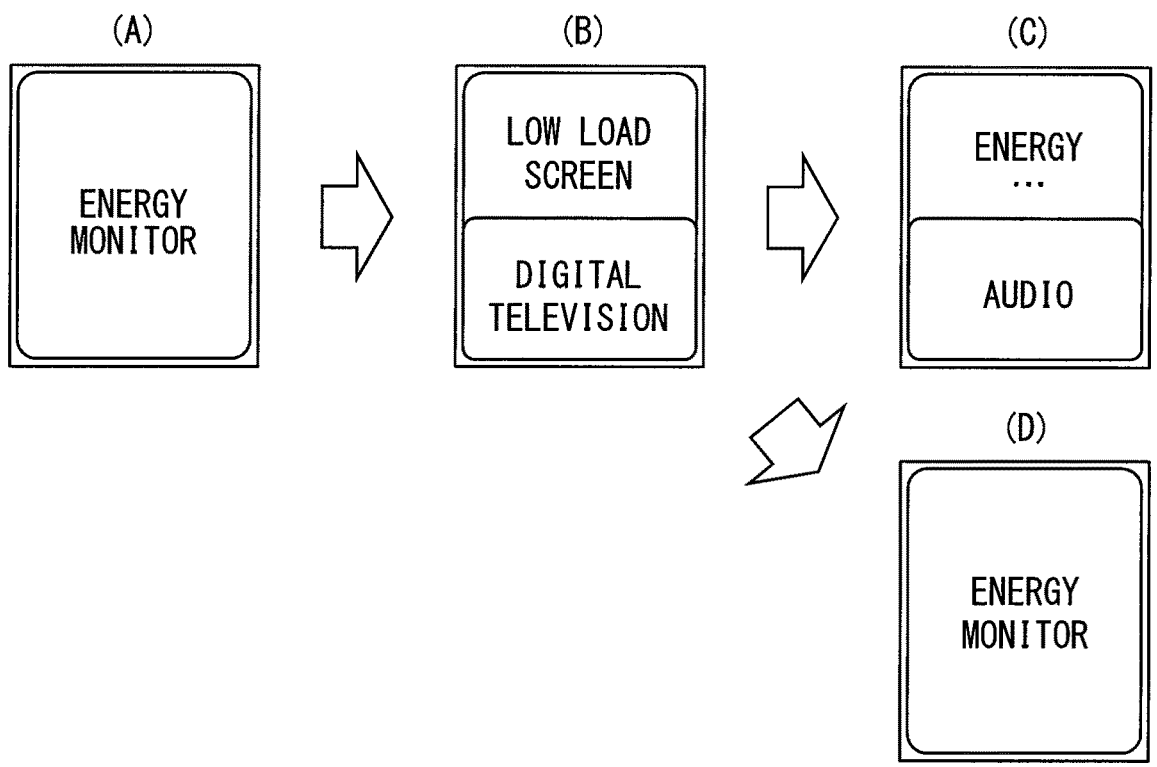
FIG. 16 is a diagram illustrating one example of variation of the screen configuration in accordance with a user operation.

In FIG. 16, (A) shows a state where the second area Ar2 and the third area Ar3 are turned off and the energy monitoring screen is displayed in the first area Ar1. That is, a state where only the energy monitoring application Ap1 is activated is shown. In the present embodiment, the energy monitoring application Ap1 is set to high in the load level as shown in FIG. 7. When the user operation that activates the digital television application Ap2 is received in a state where the energy monitoring screen is displayed, the display arbitration portion F2 displays the digital television screen in the third area Ar3 as shown in (B) of FIG. 16. Further, the display arbitration portion F2 displays the low load screen for the first area Ar1 in the first area Ar1.

This is because the digital television screen to be displayed is also set to high in the load level and the display destination of the screen to be displayed (here, the third area Ar3) is higher in the area rating than the first area Ar1 that displays the energy monitoring screen. The retracted energy monitoring screen is registered in the retraction list.

After that, when the user operation that switches the screen displayed in the second area Ar2 to the audio screen is received, the screen of the audio application Ap6 corresponding to the command operation of the user is displayed in the second area Ar2 as shown in (C) of FIG. 16. Further, the retracted energy monitoring screen is returned to the first area Ar1. The reason for returning the energy monitoring screen is because the display screen of the second area Ar2 is transferred to the screen set to low in the load level.

When the user operation that terminates the digital television application Ap2 is received in the screen configuration shown in (B) of FIG. 16, as shown in (D) of FIG. 16, the second area Ar2 is turned off. Then, the retracted energy monitoring screen is returned to the first area Ar1.

Figure 17:
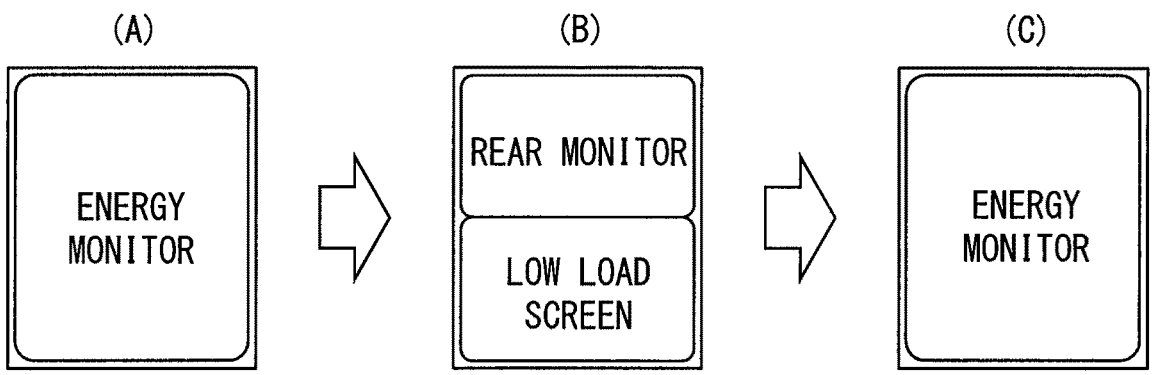
FIG. 17 is a diagram illustrating one example of the variation of the screen configuration in accordance with the user operation.

Next, an example of the switching configuration shown in FIG. 17 will be described. Similar to (A) of FIG. 16, (A) of FIG. 17 shows a state where only the energy monitoring application Ap1 is activated. When the command operation which activates the rear monitoring application Ap3 is received in such a state where only the energy monitoring application Ap1 is activated, the display arbitration portion F2 displays the low load screen for the third area Ar3 in the third area Ar3 and displays the call screen (namely, the rear monitoring screen) in the second area Ar2. Further, the energy monitoring screen is registered in the retraction list, and the first area Ar1 is turned off.

After that, when the user operation that terminates the rear monitoring application Ap3 is received in the screen configuration shown in (B) of FIG. 17, the second area Ar2 and the third area Ar3 are turned off as shown in (C) of FIG. 17. Further, the retracted energy monitoring screen is returned to the first area Ar1.

Figure 18:
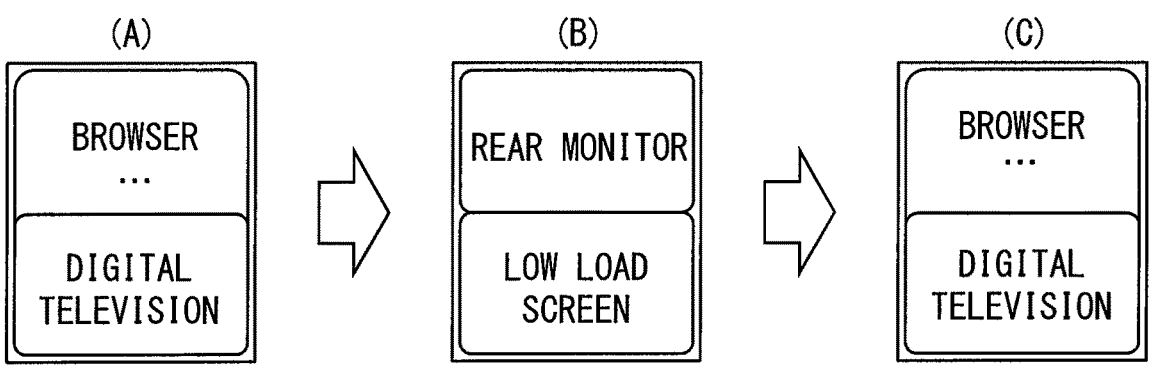
FIG. 18 is a diagram illustrating one example of the variation of the screen configuration in accordance with the user operation.

Next, an example of the switching configuration shown in FIG. 18 will be described. In FIG. 18, (A) shows a screen configuration in which the digital television application Ap2 and the browser application Ap5 are set in the active state. As shown in FIG. 7, the browser application Ap5 is formed such that the display destination of the screen is set to the first area Ar1 and the load level is set to a low level.

As shown in (A) of FIG. 18, when the user operation that activates the rear monitoring application Ap3 is received in a state where the digital television application Ap2 and the browser application Ap5 are set in the active state, the display arbitration portion F2 turns off the first area Ar1 and displays the call screen (namely, the rear monitoring screen) in the second area Ar2. Further, the display arbitration portion F2 displays the low load screen for the third area Ar3 in the third area Ar3. At this time, each of the screens of the digital television application Ap2 and the browser application Ap5 is registered in the retraction list.

After that, when the user operation that terminates the rear monitoring application Ap3 is received in the screen configuration shown in (B) of FIG. 18, the second area Ar2 is turned off and the retracted screens of the digital television application Ap2 and the browser application Ap5 are returned to the first area Ar1 and the third area Ar3 respectively as shown in (C) of FIG. 18.

As described with reference to FIG. 16 to FIG. 18, according to the display arbitration processing described above, the multiple screens of the applications set to a high level in the load level is not displayed at the same time. In a state where the screen of the application set to a high level in the load level is being displayed, when the screen of another application set to a high level in the load level is to be displayed in another area, the operation of the application with the display destination of the screen set to a display area having a higher area rating is prioritized.

(Conclusion of the First Embodiment)

According to the configuration described above, the multiple screens of the applications set to a high level in the load level is not displayed at the same time. In a state where the screen of the application set to a high level in the load level is being displayed, when the screen of another application set to a high level in the load level is displayed in another area, the operation of the application with the display destination of the screen set to a display area having a higher area rating is prioritized.

Accordingly, according to the configuration described above, it can be reduced that the CPU resource is tightened when the multiple application screens is displayed on the display 2. In other words, it can be reduced that the processing failure such as freezing and delay occurs in the display screen.

Further, in the configuration described above, in a case where the first area Ar1 and the third area Ar3 are turned on and the second area Ar2 is turned off, the CPU resource is assigned to the application that draws the screen for the third area Ar3. Further, in a case where the second area Ar2 and the third area Ar3 are turned on, the CPU resource is preferentially assigned to the application that draws the screen for the second area Ar2.

Accordingly, according to the configuration described above, it can be reduced that the failure such as the freezing and the delay occurs in the screen displayed at a position where a driver can view relatively easier.

Further, in a case where the second area Ar2 is turned on, the first area Ar1 is turned off. With this, it is not necessary to assign the CPU resource to the application that draws the screen for the first area Ar1. As a result, it can be reduced that the processing failure or the like occurs when the CPU resource is turned into a high load state due to the drawing processing of the screen corresponding to the multiple display area.

As described above, the embodiment of the present disclosure has been described, however the present disclosure is not limited to the embodiment described above. A second embodiment described below and various modified examples are encompassed in a scope of the present disclosure. Further, the present disclosure can be carried out by modifying in a scope of the subject matter of the present disclosure.

The same reference sign is assigned to a part that has the same function as the part described in the embodiment described above, and the description thereof is therefore omitted. When a part of a certain configuration is described, other parts of the configuration can adopt the configuration in the embodiment described above.

Second Embodiment

The configuration in which the display arbitration portion F2 adjusts the screen configuration such that the multiple screens of the applications, each of which is set to a high level in the load level, is not displayed at the same time has been described above, however the present disclosure is not limited to the configuration. As a second embodiment described below, the multiple screens of the applications, each of which is set to a high level in the load level, may be displayed at the same time. However, also in the second embodiment, a configuration in which the CPU resource is preferentially assigned to the application that draws the screen for the display area having a higher area rating is similarly adopted.

Figure 19:
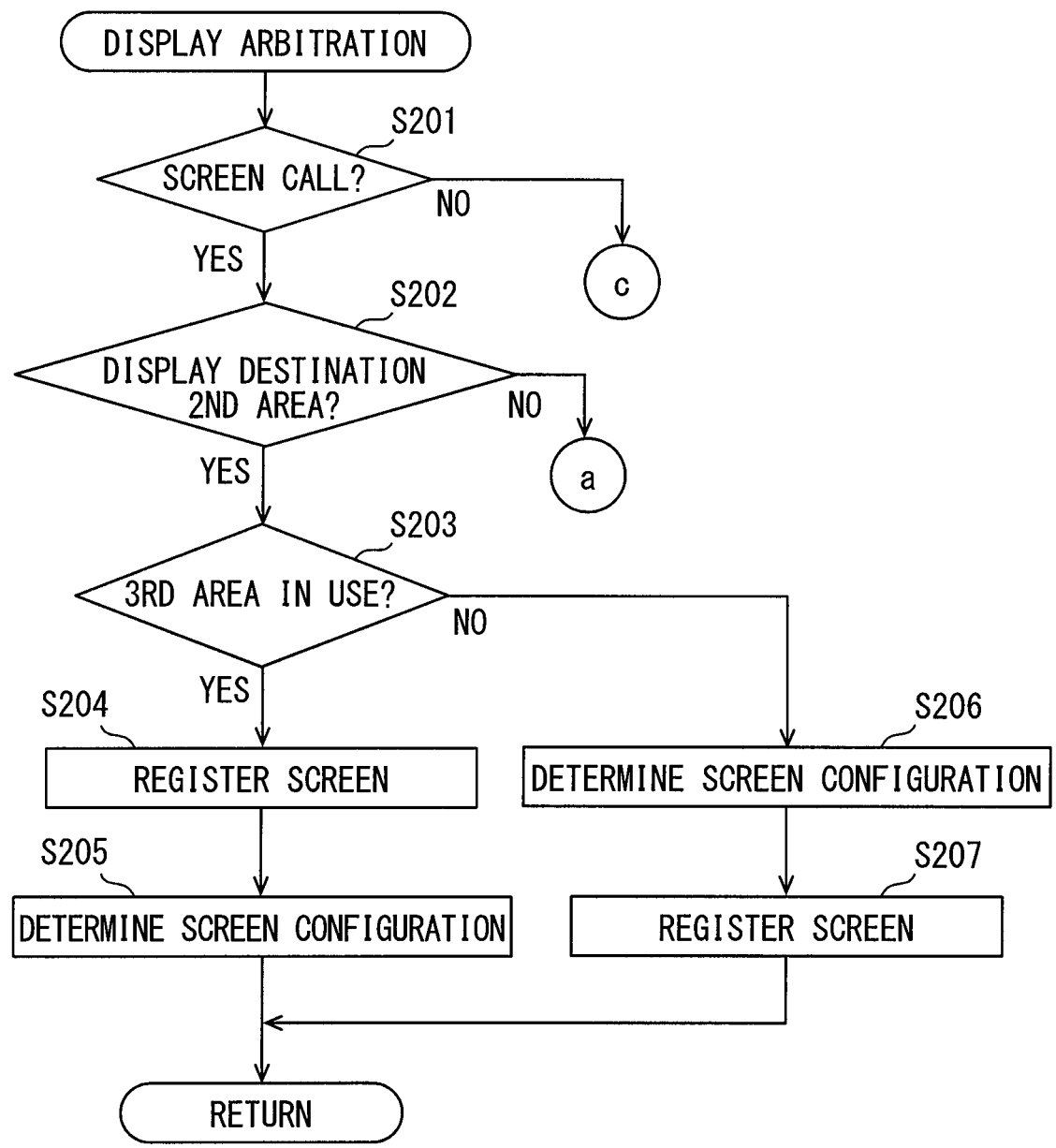
FIG. 19 is a flowchart of display arbitration processing according to a second embodiment.

The difference between the second embodiment and the first embodiment is the contents of the display arbitration processing. Accordingly, the display arbitration processing executed by the display arbitration portion F2 of the second embodiment will be mainly described below with reference to flowcharts shown in FIG. 19 to FIG. 22. The flowchart shown in FIG. 19 may be started when the procedure proceeds to S3 shown in FIG. 8.

At first, in S201, it is determined whether the operation received in S1 shown in FIG. 8 is the screen call operation. In a case where the operation received in S1 is the screen call operation, positive determination is made in S201, and the procedure proceeds to S202. On the other hand, in a case where the operation received in S1 is not the screen call operation, negative determination is made in S201, and the procedure proceeds to S230 shown in FIG. 22.

In S202, it is determined whether the display destination of the screen of the application to be activated based on the user operation is the second area Ar2 by referring to the application managing data Dt. In a case where the display destination of the screen of the application to be activated is the second area Ar2, positive determination is made in S202, and the procedure proceeds to S203. On the other hand, the display destination of the screen of the application to be activated is not the second area Ar2, negative determination is made in S202, and the procedure proceeds to S210 shown in FIG. 20.

In S203, it is determined whether the third area Ar3 is presently turned on. In a case where the third area Ar3 is turned on, positive determination is made in S203, and the procedure proceeds to S204. On the other hand, in a case where the third area Ar3 is not turned on, negative determination is made in S203, and the procedure proceeds to S206.

In S204, the screen presently displayed in the first area Ar1 is registered in the retraction list, and the procedure proceeds to S205. In a case where the second area Ar2 is already turned on when the present flow is started, the procedure may proceed to S205 by omitting S204. This is because the first area Ar1 is turned off when the second area Ar2 is also turned on.

In S205, it is determined to turn off the first area Ar1 and to display the call screen in the second area Ar2 and to keep the display of the screen presently displayed in the third area Ar3 as the screen configuration of the display 2, and the procedure returns to the display control processing as a caller.

In S206, it is determined to turn off the first area Ar1 and to display the call screen in the second area Ar2 and to display the low load screen for the third area Ar3 in the third area Ar3 as the screen configuration of the display 2, and the procedure proceeds to S207. In S207, it is stored by using a flag or the like that the screen to be displayed in the third area Ar3 is formed as a linking display screen. Then, the procedure returns to the caller.

Figure 20:
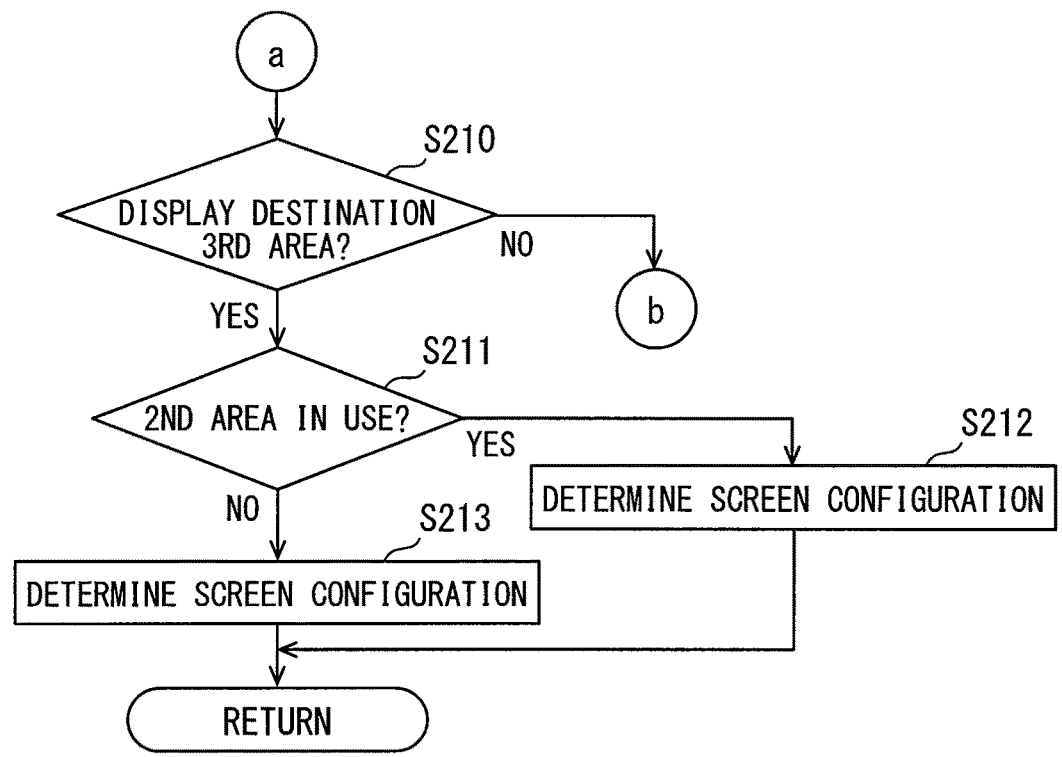
FIG. 20 is a continuation of the flowchart shown in FIG. 19.

In S210 shown in FIG. 20, it is determined whether the display destination of the screen of the application to be activated is the third area Ar3 by referring to the application managing data Dt. In a case where the display destination of the screen of the application to be activated is the third area Ar3, positive determination is made in S210, and the procedure proceeds to S211. On the other hand, in a case where the display destination of the screen of the application to be activated is not the third area Ar3, negative determination is made in S210, and the procedure proceeds to S220 shown in FIG. 21.

In S211, it is determined whether the second area Ar2 is presently turned on. In a case where the second area Ar2 is turned on, positive determination is made in S211, and the procedure proceeds to S212. On the other hand, in a case where the second area Ar2 is not turned on, negative determination is made in S211, and the procedure proceeds to S213.

In S212, it is determined to continuously display the screen presently displayed in the second area Ar2 and to display the call screen in the third area Ar3 as the screen configuration of the display 2, and the procedure returns to the caller. The first area Ar1 is kept in the off-state.

In S213, it is determined to display the screen presently displayed in the first area Ar1 and to display the call screen in the third area Ar3 as the screen configuration of the display 2, and the procedure returns to the caller. The second area Ar2 is kept in the off-state.

Figure 21:
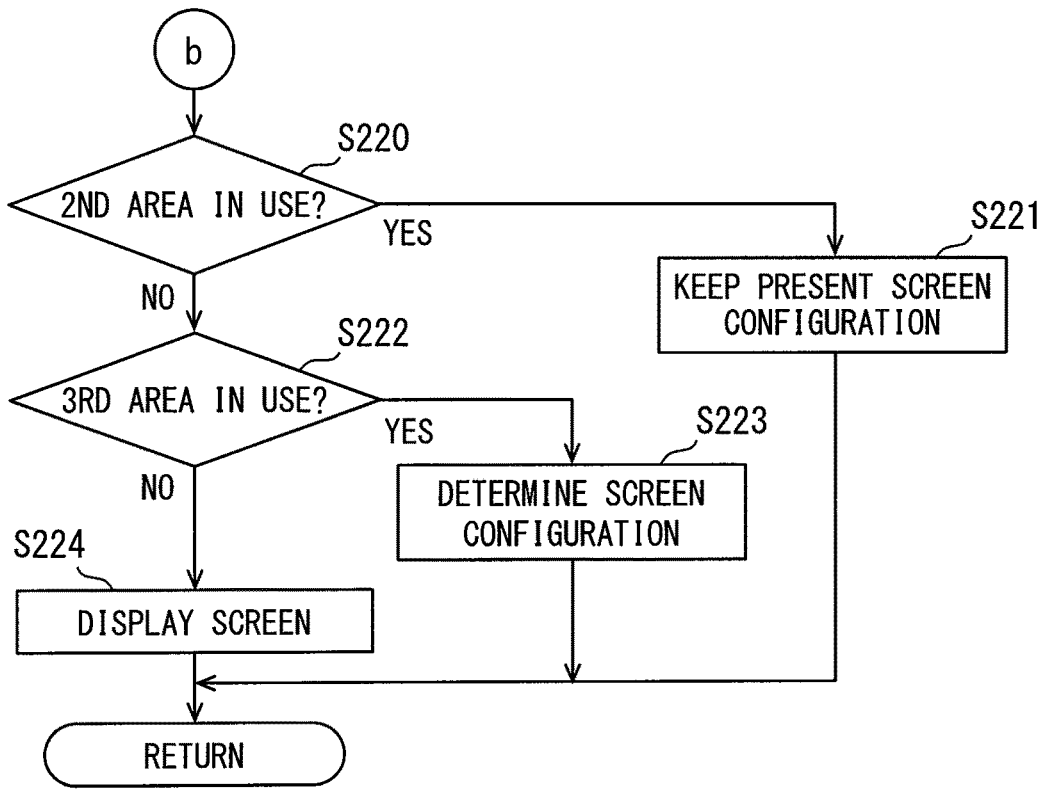
FIG. 21 is a continuation of the flowchart shown in FIG. 20.

In S220 shown in FIG. 21, it is determined whether the second area Ar2 is presently turned on. A case where the determination processing of S220 is executed is a case where the display destination of the screen of the application to be activated is set to the first area Ar1.

In S221, in a case where the second area Ar2 is turned on, positive determination is made in S220, and the procedure proceeds to S211. On the other hand, in a case where the second area Ar2 is turned off, negative determination is made in S220, and the procedure proceeds to S222.

In S221, it is determined to keep the present screen configuration, and the procedure returns to the caller. In this case, the user operation that activates the application with the display destination of the screen set to the first area Ar1 is canceled.

In S222, it is determined whether the third area Ar3 is presently turned on. In a case where the third area Ar3 is turned on, positive determination is made in S222, and the procedure proceeds to S223. On the other hand, in a case where the third area Ar3 is turned off, negative determination is made in S222, and the procedure proceeds to S224.

In S223, it is determined to display the call screen in the first area Ar1 and to keep the display of the screen presently displayed in the third area Ar3 as the screen configuration of the display 2, and the procedure returns to the caller. The second area Ar2 is kept in the off-state.

In S224, it is determined to display the call screen in the first area Ar1 as the screen configuration of the display 2, and the procedure returns to the caller. Each of the second area Ar2 and the third area Ar3 is kept in the off-state.

Figure 22:
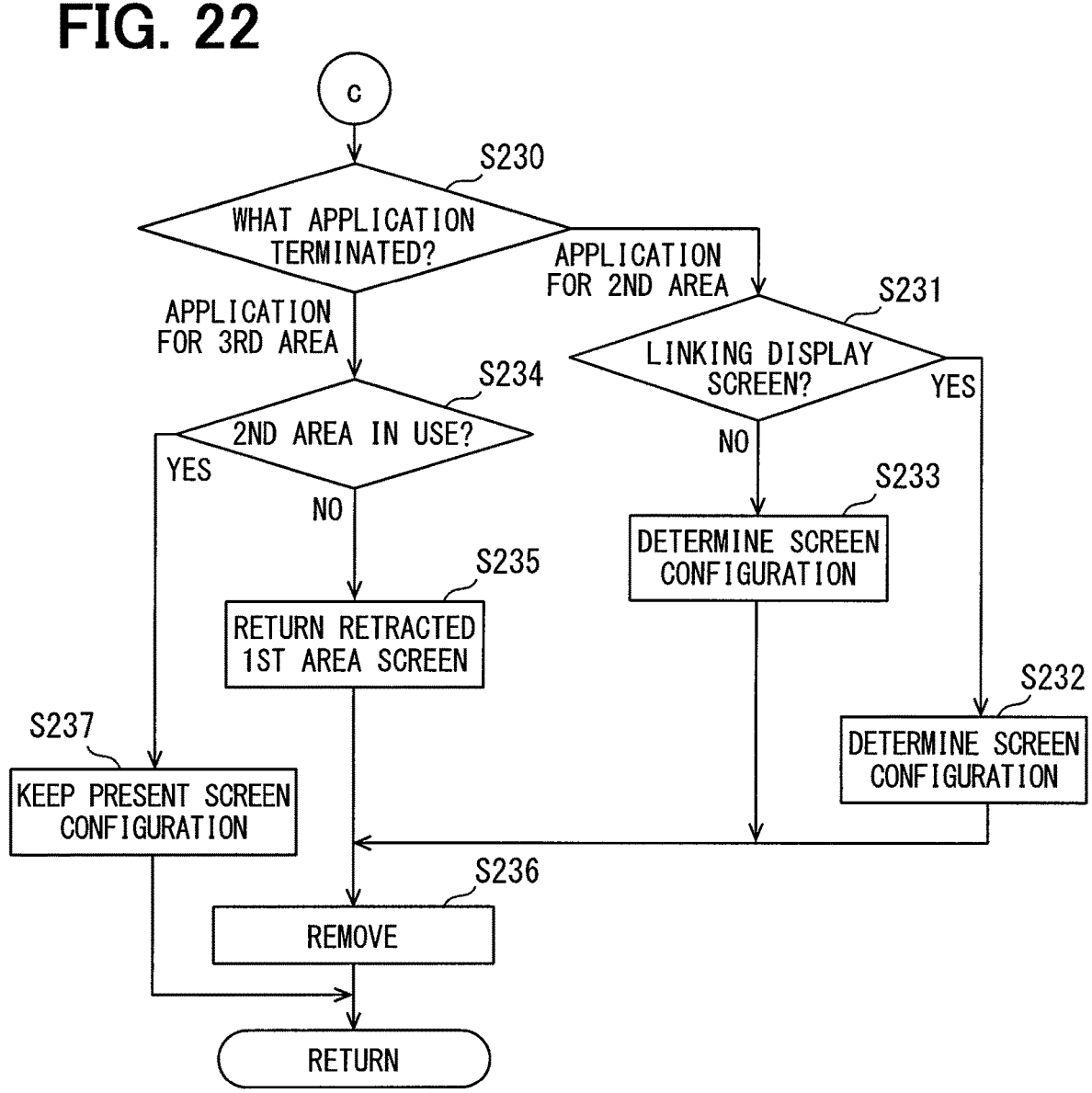
FIG. 22 is a continuation of the flowchart shown in FIG. 19.

Next, a flow after S230 shown in FIG. 22 will be described. A case where the procedure proceeds to S230 from S201 is a case where the operation received in S1 is the operation that terminates the application presently drawing the screen for the second area Ar2 or the operation that terminates the application presently drawing the screen for the third area Ar3.

In S230, it is determined which display area is the display destination of the screen of the application terminated based on the user operation. In a case where the display destination of the screen of the application to be terminated at this time is the second area Ar2, the procedure proceeds to S231. On the other hand, in a case where the display destination of the screen of the application to be terminated at this time is the third area Ar3, the procedure proceeds to S234.

In S231, it is determined whether the screen presently displayed in the third area Ar3 is the linking display screen. In a case where the screen presently displayed in the third area Ar3 is the linking display screen, positive determination is made in S231, and the procedure proceeds to S232. On the other hand, the screen presently displayed in the third area Ar3 is not the linking display screen, negative determination is made in S231, and the procedure proceeds to S233.

In S232, it is determined to return the retracted first area screen to the first area Ar1 and to turn off the third area Ar3 as the screen configuration of the display 2, and the procedure proceeds to S236.

In S233, it is determined to return the retracted first area screen to the first area Ar1 and to keep the display of the screen presently displayed in the third area Ar3 as the screen configuration of the display 2, and the procedure proceeds to S236.

In S234, it is determined whether the second area Ar2 is presently turned on. In a case where the second area Ar2 is turned on, positive determination is made in S234, and the procedure proceeds to S237. On the other hand, in a case where the second area Ar2 is turned off, negative determination is made in S234, and the procedure proceeds to S235.

In S235, it is determined to return the retracted first area screen to the first area Ar1, and the procedure proceeds to S236. In S236, the data of the first area screen (for example, the screen ID), which is determined in S232 or the like to be returned, is removed from the retraction list, and the procedure returns to the caller.

In S237, it is determined to keep the present screen configuration, and the procedure returns to the caller. In this case, the user operation that terminates the application which is drawing the screen for the third area Ar3 is canceled.

(Screen Control Executed by the HCU 1 in the Second Embodiment)

Next, one example of a switching configuration of the screen configuration executed by the HCU 1 according to the second embodiment will be described with reference to FIG. 23. For the sake of convenience, the drawing processing portion 111 has maximum frame rate performance for 60 fps as one example.

Figure 23:
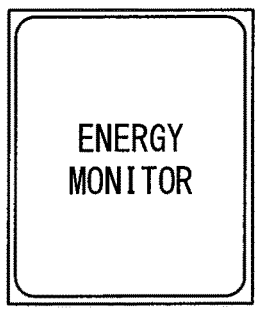
FIG. 23 is a diagram illustrating one example of variation of a screen configuration in accordance with a user operation.
Figure 23:
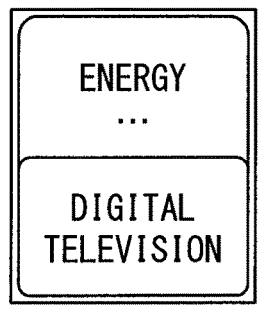

In FIG. 23, (A) shows a state where only the energy monitoring application Ap1 is active. In such a state where only the energy monitoring application Ap1 is active, the CPU resource is sufficiently secured, and therefore the energy monitoring screen is updated at a predetermined frame rate (for example, 40 fps).

When the user operation that activates the digital television application Ap2 is received in a state where only the digital television application Ap1 is active as shown in (A) of FIG. 23, the display arbitration portion F2 keeps the display of the energy monitoring screen in the first area Ar1 and displays the call screen (namely, the digital television screen) in the second area Ar2 as shown in (B) of FIG. 23.

At this time, the display arbitration portion F2 assigns the CPU resource preferentially to the digital television application Ap2 that draws the screen for the display area having a higher area rating. For example, in a case where a predetermined value of the frame rate of the digital television screen is set to 30 fps, the CPU resource for 30 fps is assigned. Further, the display arbitration portion F2 assigns the remaining CPU resource (for example, 30 fps) to the energy monitoring application Ap1.

With the processing described above, the digital television screen having a higher priority is updated at the predetermined frame rate (here, 30 fps). Further, the energy monitoring screen is updated at a speed corresponding to 30 fps. That is, the energy monitoring screen that draws the screen for the display area having a lower area rating is updated a speed lower than the predetermined frame rate.

As another example, when the CPU resource for 30 fps is assigned to the application that draws the screen for the second area Ar2 in a state where the second area Ar2 and the third area Ar3 are turned on, the remaining CPU resource for 30 fps is assigned to the application which draws the screen for the third area Ar3. In such a case, in a case where the predetermined frame rate of the screen for the third area Ar3 needs 60 fps, the screen of the third area Ar3 is updated at a frame rate of 30 fps corresponding to a half of the predetermined frame rate. To assign the CPU resource for 30 fps to the application that needs the CPU resource for 60 fps corresponds to execute the drawing processing once per 2 Vsync.

In a case where the remaining CPU resource for the display area having a lower area rating is sufficient against the CPU resource required by the application which draws the screen for the display area, the update of the screen for the display area having the lower area rating is not always slow. For example, when the remaining CPU resource for the third area Ar3 corresponds to 30 fps and the predetermined frame rate of the screen for the third area Ar3 is set to 20 fps in a state where the second area Ar2 and the third area Ar3 are turned on, the screen of the third area Ar3 is updated at a predetermined frequency.

According to a configuration described above, the multiple screens of the applications set to a high level in the load level can be displayed at the same time and the update of the screen for the display area having a higher area rating can be executed at the predetermined frame rate. That is, it can be reduced that the processing failure or the like occurs in the screen displayed at a position where a user can view relatively easier.

(First Modification)

The configuration in which the display screen of the display is controlled by using the divided three display areas has been exemplary described above, however the present disclosure is not limited to the configuration. The display screen of the display may be controlled by using divided four or more display areas. Also in such a case, the priority for assigning the CPU resource to the multiple display areas (namely, the area rating) may be appropriately defined.

(Second Modification)

The configuration in which the on-vehicle display is the control target has been described above as an application example of the display control apparatus, however the present disclosure is not limited to the configuration. The display control apparatus may be applied to a display arranged in a house or an office, or a display of a portable terminal device.

It is noted that a flowchart or the processing of the flowchart in the present application includes multiple steps (also referred to as sections), each of which is represented, for instance, as S1. Further, each step can be divided into several sub-steps while several steps can be combined into a single step.

While various embodiments, configurations, and aspects of a display control apparatus have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. A display control apparatus that controls a display screen of a display, the display control apparatus comprising:
    an operation receiving portion that receives, through a predetermined input device, command operation of a user for displaying a screen of predetermined application software on the display;
    a drawing processing portion that draws an application image to be displayed on the display as a screen of the application software, based on the command operation received by the operation receiving portion; and
    a display processing portion that generates a display image to be displayed as the display screen on the display by using the application image generated by the drawing processing portion, and displays the generated display image on the display; and
    a display arbitration portion that arbitrates a screen configuration of the display,
    wherein:
    a plurality of display areas is set in the display screen;
    an area rating, which indicates ranking of visibility of information for a user, is assigned in advance to each of the display areas;
    a display area, which is a display destination of a screen corresponding to the application software, is set in advance in the application software;
    the drawing processing portion is configured to draw the application image to be displayed in a display area having a higher area rating preferentially rather than the application image to be displayed in a display area having a lower area rating in the plurality of display areas;
    a load level, which indicates whether a load of the drawing processing portion for drawing the application image corresponding to the application software is high level or low level, is set in the application software; and
    when the operation receiving portion receives the command operation that displays a high load application image, which is the application image of the application software set in a high level in the load level, in a predetermined display area in a state where another high load application image is already displayed in another display area having an area rating higher than the area rating of the display area in which the high load application image is to be displayed, the display arbitration portion discards the command operation received at this time and keeps a present screen configuration.

2. The display control apparatus according to claim 1, wherein:
    when the operation receiving portion receives the command operation that displays the high load application image in the predetermined display area in a state where another high load application image is displayed in another display area having an area rating lower than the area rating of the display area in which the high load application image is to be displayed,
    the display arbitration portion makes the drawing processing portion preferentially draw the application image corresponding to the command operation received at this time and display a predetermined application image set in a low level in the load level in the display area in which another high load application image is displayed.

3. The display control apparatus according to claim 1, wherein:
    the plurality of display areas includes a first display area, a second display area, and a third display area;
    the display processing portion generates the display image by overlapping images arranged in a first layer arranged at a front side in the display screen and a second layer arranged closer to a rear side than the first layer;
    the first display area is arranged on the second layer;
    the second display area and the third display area are arranged on the first layer;
    the second display area is arranged at a position in the first layer relatively easily viewed by a user compared to the third display area;
    in a case where the image to be displayed in the second display area is not generated by the drawing processing portion,
    the display processing portion displays a part arranged at a rear of the second display area among the image arranged in the first display area by transmitting the image through the second display area;
    in a case where the image to be displayed in the third display area is not generated by the drawing processing portion,
    the display processing portion displays a part arranged at a rear of the third display area among the image arranged in the first display area by transmitting the image through the third display area; and
    in a case where the drawing processing portion needs to draw the application image to be displayed in the second display area,
    the drawing processing portion draws the application image to be displayed in the second display area preferentially compared to the application image to be arranged in another display area.

4. The display control apparatus according to claim 3, wherein:
    when the operation receiving portion receives the command operation of a user, which displays the high load application image in the third display area, in a state where the high load application image is displayed in the second display area,
    the display arbitration portion discards the command operation received at this time and keeps the present screen configuration.

5. The display control apparatus according to claim 3, wherein:
    when the command operation, which displays another high load application image in the second display area, is received in a state where the high load application image is displayed in the third display area,
    the display arbitration portion changes the image displayed in the third display area into the application image of a predetermined application software having a low level in the load level.

* * * * *